(12) United States Patent
Hasegawa et al.

(10) Patent No.: US 6,255,760 B1
(45) Date of Patent: Jul. 3, 2001

(54) DRIVING APPARATUS OF PIEZOELECTRIC VIBRATOR

(75) Inventors: Kazuo Hasegawa; Daisuke Takai, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/579,396

(22) Filed: May 25, 2000

(30) Foreign Application Priority Data

May 28, 1999 (JP) .................................................. 11-149805

(51) Int. Cl.[7] .............................. H01L 41/06; H02N 2/00
(52) U.S. Cl. ...................... 310/317; 310/316.01; 310/319
(58) Field of Search ............................... 310/317, 316.01, 310/319

(56) References Cited

U.S. PATENT DOCUMENTS

| | | | |
|---|---|---|---|
| 4,692,649 | * | 9/1987 | Izukawa ................................ 310/317 |
| 5,412,204 | * | 5/1995 | Nakamura ............................ 310/316 |
| 5,451,828 | | 9/1995 | Tomikawa et al. . |
| 5,850,035 | | 12/1998 | Layton et al. . |
| 5,893,054 | | 4/1999 | White . |
| 5,955,819 | * | 9/1999 | Takano ................................. 310/317 |
| 6,118,206 | * | 9/2000 | Toda ..................................... 310/317 |

FOREIGN PATENT DOCUMENTS

| | | | |
|---|---|---|---|
| 083704A2 | * | 10/1997 | (EP) ..................................... 310/317 |
| 07174566 | | 7/1995 | (JP) . |
| 08054238 | | 2/1996 | (JP) . |

* cited by examiner

*Primary Examiner*—Nestor Ramirez
*Assistant Examiner*—Karen Addison
(74) *Attorney, Agent, or Firm*—Brinks Hofer Gilson & Lione

(57) ABSTRACT

Two current outputs are converted into voltage outputs by I/V converters, and further converted into digital outputs D1 and D2 by binarizing circuits. The outputs are added by an adder in a phase shifter, and converted into an output like a triangular wave by an integrator. The output like a triangular wave is compared with a reference in a binarizing circuit and, therefore, it is possible to shift the phase from the median of the phase differential between the two signals by 90 deg with high precision.

5 Claims, 20 Drawing Sheets

FIG. 8
(A)
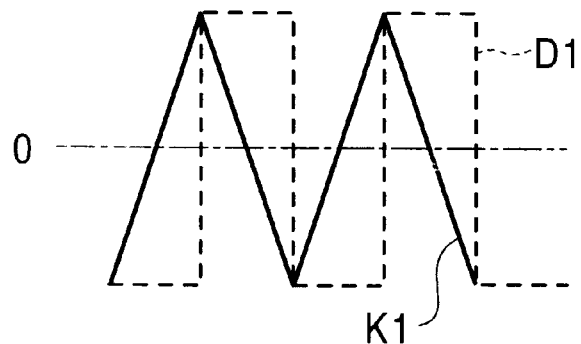
(B)
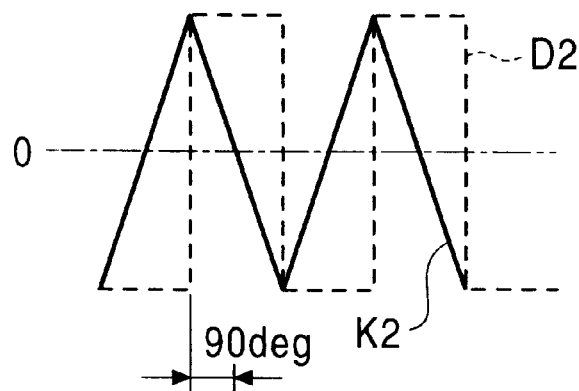
(C)
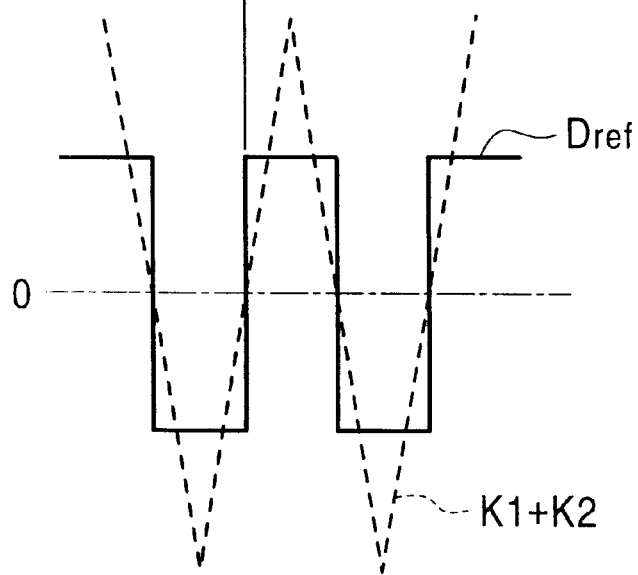

DRIVING APPARATUS OF PIEZOELECTRIC VIBRATOR

BACKGROUND OF THE INVENTION

1. Field of the Invention

The present invention relates to a driving apparatus of a piezoelectric vibrator used for a gyroscope, etc., more particularly, to a driving apparatus of a piezoelectric vibrator capable of being driven by a stable phase.

2. Description of the Related Art

FIG. 17 is a circuit constructional diagram showing driving means and detecting means of a piezoelectric vibrator for a conventional gyroscope; FIG. 18 is a perspective view showing a piezoelectric vibrator of a three-leg tuning fork type used for a gyroscope; FIG. 19 shows one constructional example of an end surface of a piezoelectric vibrator and is a front view thereof in the view of a direction of an arrow 19 in FIG. 18; FIG. 20 is a front view showing another constructional example of the end surface of the piezoelectric vibrator; and FIGS. 21(A) and 21(B) show diagrams using a conventional method of obtaining the median of a phase differential between two voltage outputs, FIG. 21(A) shows a case wherein a differential of amplitudes is equal to zero, and FIG. 21(B) shows a case wherein amplitudes have a differential.

As shown in FIG. 17, the conventional gyroscope comprises: a piezoelectric vibrator 1; driving means (AC drive signal source) 10 for supplying a drive signal to the piezoelectric vibrator 1; and detecting means 20 for detecting an output signal from the piezoelectric vibrator 1.

To start with, the piezoelectric vibrator 1 will be described. As shown in FIG. 18, the piezoelectric vibrator 1 is formed by adhering a piezoelectric material to both the front and back surfaces of a plane plate, which is made up of a constant-modulus material such as elinvar, alternatively by a plate material which is formed by a piezoelectric material such as PZT or crystal wholly. The piezoelectric vibrator 1 has three vibrating legs 1u, 1v and 1w which are formed in a forked manner at one end of the piezoelectric vibrator 1. As shown in FIG. 18, FIG. 19, and FIG. 20, pairs of drive electrodes 1a and 1b, a and b, and 2a and 2b are formed onto the front surfaces of the vibrating legs 1u, 1v, and 1w, so as to extend in parallel from one end portion to a base end portion. Pairs of output electrodes 1c and 1d, c and d, and 2c and 2d are also formed onto the back surfaces of the vibrating legs 1u, 1v, and 1w, respectively. An earth electrode G is formed in the middle of the output electrodes c and d on the back surface of the vibrating leg 1v as a center, so as to extend from one end portion to the base end portion.

Arrows in FIG. 19 indicate dielectric polarizing directions of the piezoelectric material at the three vibrating legs 1u, 1v, and 1w of the piezoelectric vibrator 1. The dielectric polarizing directions are the same at the vibrating legs 1u and 1w of the piezoelectric vibrator 1 on both right and left sides. The dielectric polarizing directions of the center vibrating leg 1v contrast with the vibrating legs 1u and 1w on the right and left sides horizontally and vertically, respectively (a differential polarizing type).

In the piezoelectric vibrator 1 of the differential polarizing type, if supplying the same drive signal S to the drive electrodes 1a and 1b, a and b, and 2a and 2b from the driving means (AC drive signal source) 10, a piezoelectric effect causes the vibrating legs 1u, 1v, and 1w to be vibrated to an X-direction serving as an array direction of the vibrating legs, as shown in FIG. 19.

A primary or multiple mode causes deformation vibration bending to the X-direction in the vibrating legs 1u, 1v, and 1w. The vibrating leg 1u and 1w on both sides are driven by the same phase. The vibrating leg 1v at the center is driven so that this phase is different from the vibrating legs 1u and 1w by $\pi$ (180°), respectively. That is, when the vibrating legs 1u and 1w on both sides have an amplitude direction as a (+X)-direction at a certain point, the center vibrating leg 1v has an amplitude direction of a (−X)-direction.

As mentioned above, if setting the vibrating legs to a rotational system having a Z-direction with a vibrated state, Coriolis force works in a direction perpendicular to the vibrating direction (X-direction) to the vibrating legs, and the vibrating legs are vibrated to a Y-direction. With respect to a vibrating component due to the Coriolis force, the phases of the vibrating legs 1u and 1w on both sides are also opposite to the phase of the center vibrating leg 1v. When Coriolis force causes the vibrating legs 1u and 1w on both sides to have an amplitude component of a (+Y)direction at a certain point, the center vibrating leg 1v has an amplitude of a (−Y)-direction.

As shown in FIG. 20, in case of a piezoelectric vibrator (the same polarizing type) 1b such that all of the dielectric polarizing directions of the vibrating legs 1u, 1v, and 1w are formed to have the same direction, drive signal S1 and S2 having a differential phase of 180° each other are supplied between adjacent drive electrodes on one vibrating leg, respectively. In other words, the drive signal S1 is supplied to the drive electrodes 1b and 2b in the (+X)-direction in the vibrating legs 1u and 1w on both sides, and the drive signal S2 is supplied to the drive electrodes 1a and 2a in the (−X)-direction therein. Contrarily, the d rive signal S2 is supplied to the drive electrode b in the (+X)-direction in the vibrating leg 1v, and the drive signal S1 is supplied to the drive electrode a in the (−X)-direction therein. As stated above, the drive signals S1 and S2 are supplied to the drive electrodes of the vibrating legs 1u, 1v, and 1w, respectively, thereby enabling the piezoelectric vibrator 1B to be vibrated similarly to the piezoelectric vibrator 1.

If setting the piezoelectric vibrator (the differential polarizing type) 1 or 1b (the same polarizing type) to any desired rotational system, current outputs I1 and I2 like sine waves with different phases are outputted between the earth electrode G and the output electrode c and between the earth electrode G and the output electrode d, respectively. A signal is outputted so that the median of the phase differential between the current outputs I1 and I2 is synchronized with a timing of a leading edge of the drive signal S. Properly speaking, the driving means 10 is feedback-controlled so that the drive signal S is synthesized with the median of the phase differential between the current outputs I1 and I2.

The next description turns to the operation of the driving means 10 and the detecting means 20. It is noted that it is assumed that when setting the phase differential between the current outputs I1 and I2 to $\lambda$, $\lambda/2$ as the median of the phase differential $\lambda$ is set to a reference point (0 deg) of the phase.

As shown in FIG. 17, the driving means 10 comprises: I/V (current/voltage) converting means 11; adding means 12; first phase shifting means 13; a coupling capacitor C1; binarizing means 14; second phase shifting means 15; gain varying means 16; and buffer means 17. The detecting means 20 comprises binarizing means 21 and phase differential detecting means 22.

In the piezoelectric vibrator 1, the output electrodes c and d of the center vibrating leg 1v are connected to the I/V (current/voltage) converting means 11 which is provided for the first stage of the driving means 10. The I/V (current/voltage) converting means 11 is constructed by an operational amplifier, etc. mainly, and comprises I/V converting circuits 11A and 11B, to which a resistor, a capacitor, and the like are attached externally around the operational amplifier, etc. The output electrode c of the piezoelectric vibrator 1 is connected to an input terminal 11a1 of the I/V converting circuit 11A, and the output electrode d is connected to an input terminal 11b1 of the I/V converting circuit 11B, respectively. The earth electrode G is connected to a reference potential (such as 0V).

The I/V converting circuits 11A and 11B convert into voltage outputs V1 and V2, the current outputs I1 and I2 like sine waves which are outputted from the output electrodes c and d. Note that this current/voltage conversion causes the voltage outputs V1 and V2 to be phase-delayed by −180 deg from the current outputs I1 and I2.

As shown in FIG. 17, output terminals 11a2 and 11b2 of the I/V converting circuits 11A and 11B are connected to the adding means 12. The adding means 12 comprises, for example, a resistor for dividing outputs of the I/V converting circuits 11A and 11B and a buffer circuit (not shown) having a high input impedance. The voltage outputs V1 and V2 are set to an additional voltage of V0 which is obtained by analog addition by the adding means 12. Incidentally, the phase is not shifted herein.

The first phase shifting means (analog phase shifter) 13 is provided for a post stage (third stage) of the adding means 12, and the additional voltage V0 is inputted to the first phase shifting means 13. The first phase shifting means 13 controls a peak value of the adding voltage V0 of the additional means 12 to simulate the median of the phase differential between the voltage outputs V1 and V2, and generates a reference signal (analog value) ref which is obtained by shifting the adding signal from the peak value by +90 deg. Therefore, the adding signal is shifted by [−180+(+90)=−90] deg from the reference point of the phase. It is to be noted that the reference signal ref is supplied to binarizing means 21c, which will be described hereinlater.

The coupling capacitor C1 is provided for a post stage (forth stage) of the first phase shifting means 13, and a DC component of the reference signal ref is cut. The first binarizing means 14 is provided for a post stage (fifth stage) of the coupling capacitor C1. The first binarizing means 14 converts the reference signal ref into a binarizing code (digital value) including signals of the "H" level and "L" level. Namely, an arbitrary threshold level (voltage) is set to a reference, and a reference signal V0' is converted into the "L" level signal if the reference signal V0' is equal to or more than the threshold level, and the reference signal 0V' is converted into the "H" level signal if it is equal to or less than the threshold level. Consequently, the phase is delayed by −180 deg in the first binarizing means 14. This results in delay by [−90+(−180)=−270] deg, in view of the reference point of the phase.

The second phase shifting means (digital phase shifter) 15 is provided for a sixth stage. The second phase shifting means 15 functions to shift the phase of the first binarizing means 14 by −90 deg. Therefore, the output of the second phase shifting means 15 is shifted by [−270+(−90)=−360=0] deg, namely, to the reference point of the phase. The output of the second phase shifting means 15 is amplified to a predetermined amplitude by the gain varying means (driving circuit) 16 provided for a post stage (seventh stage), and converted into the drive signal S (drive power) like a sine wave again. The drive signal S is a signal having a phase differential of 0 from the reference point of the phase, and supplied to the drive electrodes 1a, 1b, a, b, 2a, and 2b of the piezoelectric vibrator 1, by way of the buffer means 17.

The detecting means 20 is provided with the second binarizing means 21 for binarizing the voltage outputs V1 and V2 of the I/V converting means 11. The second binarizing means 21 comprises three binarizing circuits 21a, 21b, and 21c. The voltage output V1 of the I/V converting circuit 11A is inputted to the binarizing circuit 21a among the binarizing circuits 21a and 21c, and the voltage output V2 of the I/V converting circuit 11B is inputted to the binarizing circuit 21b. The binarizing circuits 21a and 21b convert the voltage outputs V1 and V2 of the I/V converting means 11 into digital outputs D1 and D2 having the "H" signal and "L" signal at a predetermined threshold level, respectively. Incidentally, the voltage outputs V1 and V2 are shifted by −180 deg in the binarizing circuits 21a and 21b. Accordingly, in view of the reference point of the phase, the phase differential is equal to [−180+(180)=−360=0] deg.

The reference signal ref, which is phase-shifted by the first phase shifting means 13 at the third stage of the driving means 10, is inputted to the remaining binarizing circuit 21c among the second binarizing means 21, and converted into a digital reference signal $D_{ref}$ having the "H" level signal and "L" level signal at a predetermined threshold level (voltage). In this case, a phase of the digital reference signal $D_{ref}$ is equal to [−90−(180)=−270] deg (=+90 deg) for the reference point of the phase. Namely, this case is set to generate a phase differential of 90 deg between the digital outputs D1 and D2 and the digital reference signal $D_{ref}$.

The phase differential detecting means 22 comprises: a set of Exor gates 23 and 24; low-pass filters 25 and 26; and differential amplifying means 27. An exclusive OR between the digital output D1 and the digital reference signal $D_{ref}$ is obtained in the first Exor gate 23. An exclusive OR between the digital output D2 and the digital reference signal $D_{ref}$ is obtained in the second Exor gate 24. The outputs are integrated and smoothed by the low-pass filters 25 and 26, converted into DC voltage values, and the differential amplifying means 27 further detects an angular velocity output Vout proportional to Coriolis force.

The thus-detected angular velocity output Vout is further value-integrated by integrating means (not shown) and an angle is obtained, thereby using the angle as an internal signal of the gyroscope.

SUMMARY OF THE INVENTION

However, according to the driving means and detecting means of the conventional piezoelectric vibrator, the following problems arise.

As shown in FIG. 21(A), the first phase shifting means 13 of the driving means 10 sets a position $P_0$ of a peak value $V_{p0}$ of the additional signal V0, which is obtained by analog-adding the voltage output V1 and the voltage output V2 after I/V conversion, to the median $\lambda/2$ of the phase differential $\lambda$ between the voltage output V1 and voltage output V2. The additional signal V0 is shifted by 90 deg with reference to the position $P_0$. According to this method, when an amplitude differential between the voltage output V1 and the voltage output V2 is equal to 0, the median $\lambda/2$ of the phase differential $\lambda$ between the voltage outputs V1 and V2 coincides with the position $P_0$ of the peak value $V_{p0}$ of the additional signal V0.

However, as shown in FIG. 21(B), when the amplitude peak of the voltage output V1 does not coincide with that of the voltage output V2, in other words, an amplitude differential occurs between the voltage output V1 and the voltage output V2, the position $P_0$ of the peak value $V_{p0}$ of the additional signal V0 does not exist at the position of the median $\lambda/2$ of the amplitude differential between the voltage output V1 and the voltage output V2, but is drawn toward either one of the voltage output V1 and the voltage output V2, whose amplitude is larger (V1 in the FIG. 21(B)), and deviated. Thus, a phase deviation $\lambda_0$ occurs between the position $P_0$ of the peak value $V_{p0}$ and the actual phase median $\lambda/2$, and this results in variation in the reference signal ref which is obtained by shifting the adding signal V0 by 90 deg with reference to the position $P_0$ of the peak value $V_{p0}$. When the variation occurs, the phase is also deviated in a variety of means (such as the first binarizing means 14) which is provided sequentially to the post stage of the first phase shifting means 13, so that there is a problem to eventually make it impossible to supply the drive signal S synchronous with the current outputs I1 and I2 to the drive electrodes 1a, 1b, a, b, 2a, and 2b of the piezoelectric vibrator 1.

Since the phase deviation also occurs in the phase of digital reference signal $D_{ref}$ which is generated by the binarizing circuit 21c, it is impossible to exactly set to 90 deg, the phase differentials between the digital reference signal $D_{ref}$ and the digital output D1 and between the digital reference signal $D_{ref}$ and the digital output D2. Therefore, there is a problem to cause an error in the angular output which is obtained by detecting the angular velocity output Vout by the phase differential detecting means 22 and further by integrating a value of the angular velocity output Vout.

According to another conventional construction (not shown), the drive signal S supplied to the piezoelectric vibrator 1 is detected, a phase differential between the drive signal S and the median of the current outputs I1 and I2 is detected, the phase differential is controlled to be equal to 0. However, the construction arises a problem that it is necessary to provide an electrode for detecting the drive signal S for the piezoelectric vibrator 1 and the structure of the piezoelectric vibrator 1 and the wiring process become complicated.

To solve the conventional problems, it is an object of the present invention to provide a driving apparatus of a piezoelectric vibrator to increase stability of a feedback control system of the piezoelectric vibrator 1 by exactly shifting the reference signal by a predetermined phase amount from the median of the phase differential between the voltage outputs which are obtained by I/V converting the current outputs of the piezoelectric vibrator.

According to the present invention, there is provided a driving apparatus of a piezoelectric vibrator, comprising: a piezoelectric vibrator having a pair of drive electrodes on one surface of a vibrating leg and a pair of output electrodes on another surface thereof; first and second I/V converting means for converting first and second current outputs detected by the pair of drive electrodes into first and second voltage outputs; first and second binarizing means for converting the voltage outputs to first and second digital outputs with reference to a predetermined threshold level; phase shifting means for generating a reference signal from the first and second digital outputs; amplitude control means for adding a predetermined bias voltage to the reference signal; a low-pass filter for shifting a phase of an output of the amplitude control means and converting a rectangular wave into a sine wave; and driving means for generating a drive signal to vibrate the piezoelectric vibrator from an output of the low-pass filter, in that the drive signal is generated with reference to the median of a phase differential between the first and second current outputs.

According to the present invention, the first and second current outputs are converted into the first and second digital outputs proportional to pulse widths of the first and second current outputs finally, the drive signal is generated with reference to the median of the phase differential between the first and second digital outputs, and the drive signal is supplied to the drive electrodes of the piezoelectric vibrator. Since a peak value of an amplitude of an additional signal of the first and second current outputs is not set to the median of the phase differential, differently from the conventional manner, it is able to generate the drive signal exactly even if the amplitude differential occurs between the first and second current outputs. Accordingly, it is possible to stabilize a feedback system of the driving apparatus.

There is used no construction that the drive signal supplied to the piezoelectric vibrator is detected actually, the phase differential between the drive signal and the current outputs is detected, and the phase differential is controlled to 0, so that it is unnecessary to provide an electrode for detecting the drive signal for the piezoelectric vibrator.

In the foregoing, preferably, the phase shifting means comprises an adder, an integrator, and a binarizing circuit.

In the above-mentioned construction, it is exemplified that the first and second digital outputs may be integrated and binarized after addition, or the first and second digital outputs may be integrated, respectively, and the signals after integration may be added and binarized.

Preferably, the phase shifting means may comprise an adder, a differential amplifier, a low-pass filter, a VCO, a divider and a phase comparator constructing a part of phase differential detecting means.

According to the construction, it is possible to use a signal extracted from the part of the phase differential detecting means as a PLL. The phase comparator can be shared to the phase differential detecting means and the PLL. Accordingly, the construction of a gyroscope can be simplified.

According to the construction, the reference signal can be phase-shifted by a predetermined amount from the median of the phase differential between the first and second digital outputs.

For instance, the phase of the reference signal is deviated by 90 deg from the median of the phase differential between the first and second digital outputs.

BRIEF DESCRIPTION OF THE DRAWINGS

FIG. 5(A) shows the digital output D1, FIG. 5(B) the digital output D2, and FIG. 5(C) the output K0 of the phase shifting means;

FIGS. 8(A) to 8(C) are diagrams of output waveforms of units when there is no phase differential between the digital outputs D1 and D2, FIG. 8(A) shows a diagram showing an output waveform of one integrator, FIG. 8(B) a diagram showing an output waveform of another integrator, and FIG. 8(C) a diagram showing an output waveform of an adder and a binarizing circuit;

FIG. 9(A) shows a diagram showing an output waveform of one integrator, FIG. 9(B) a diagram showing an output waveform of another integrator, and FIG. 9(C) a diagram showing an output waveform of an adder and a binarizing circuit;

FIG. 21(A) shows a case wherein there is no differential between amplitudes; and FIG. 21(B) shows a case wherein there is a differential between amplitudes.

DESCRIPTION OF THE PREFERRED EMBODIMENTS

The present invention will be described with reference to the drawings hereinbelow.

Figure 1:
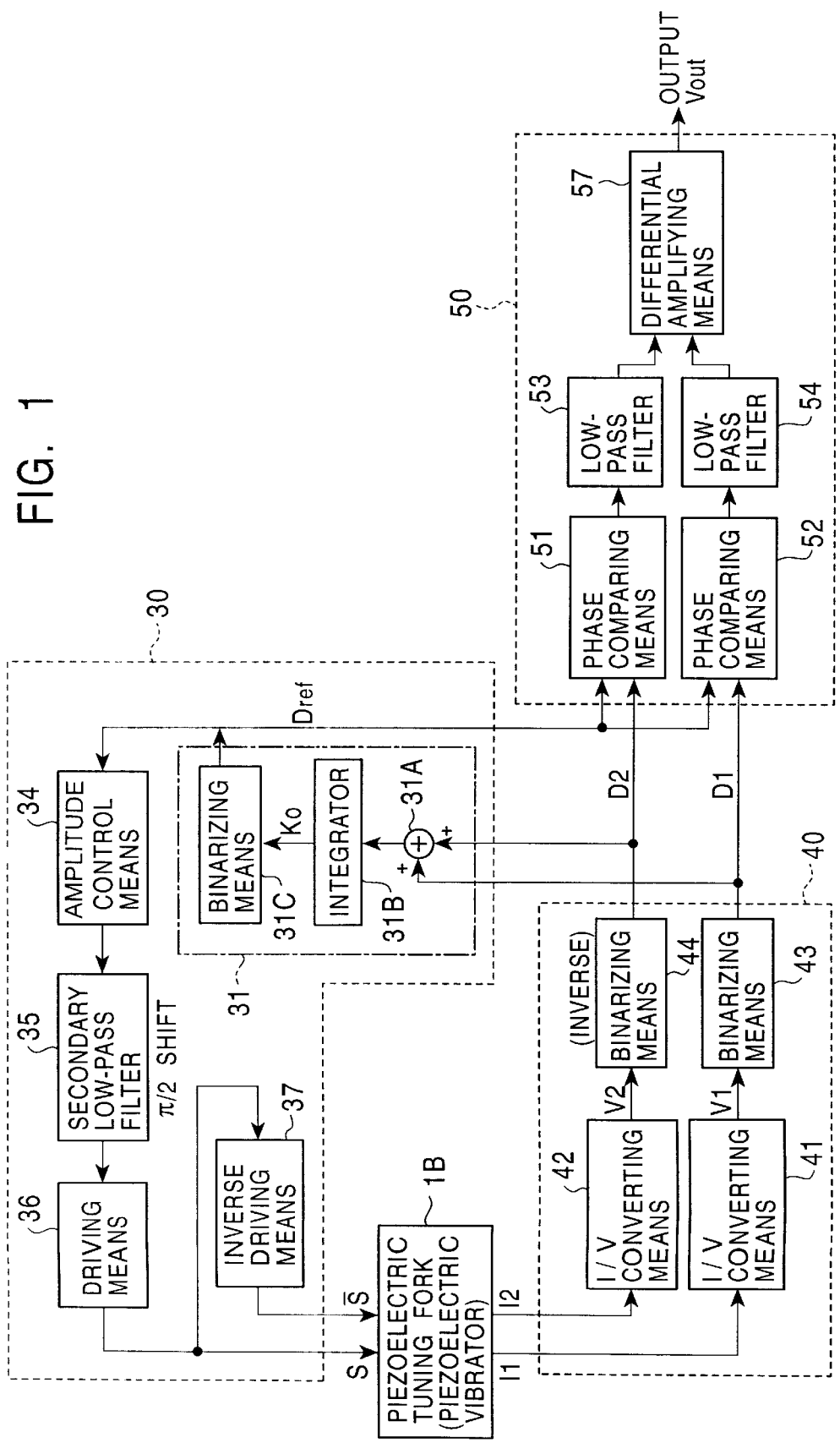
FIG. 1 is a block constructional diagram in case of a piezoelectric vibrator of the same polarizing type as an embodiment of a driving apparatus of a piezoelectric vibrator for a gyroscope according to the present invention.
Figure 2:
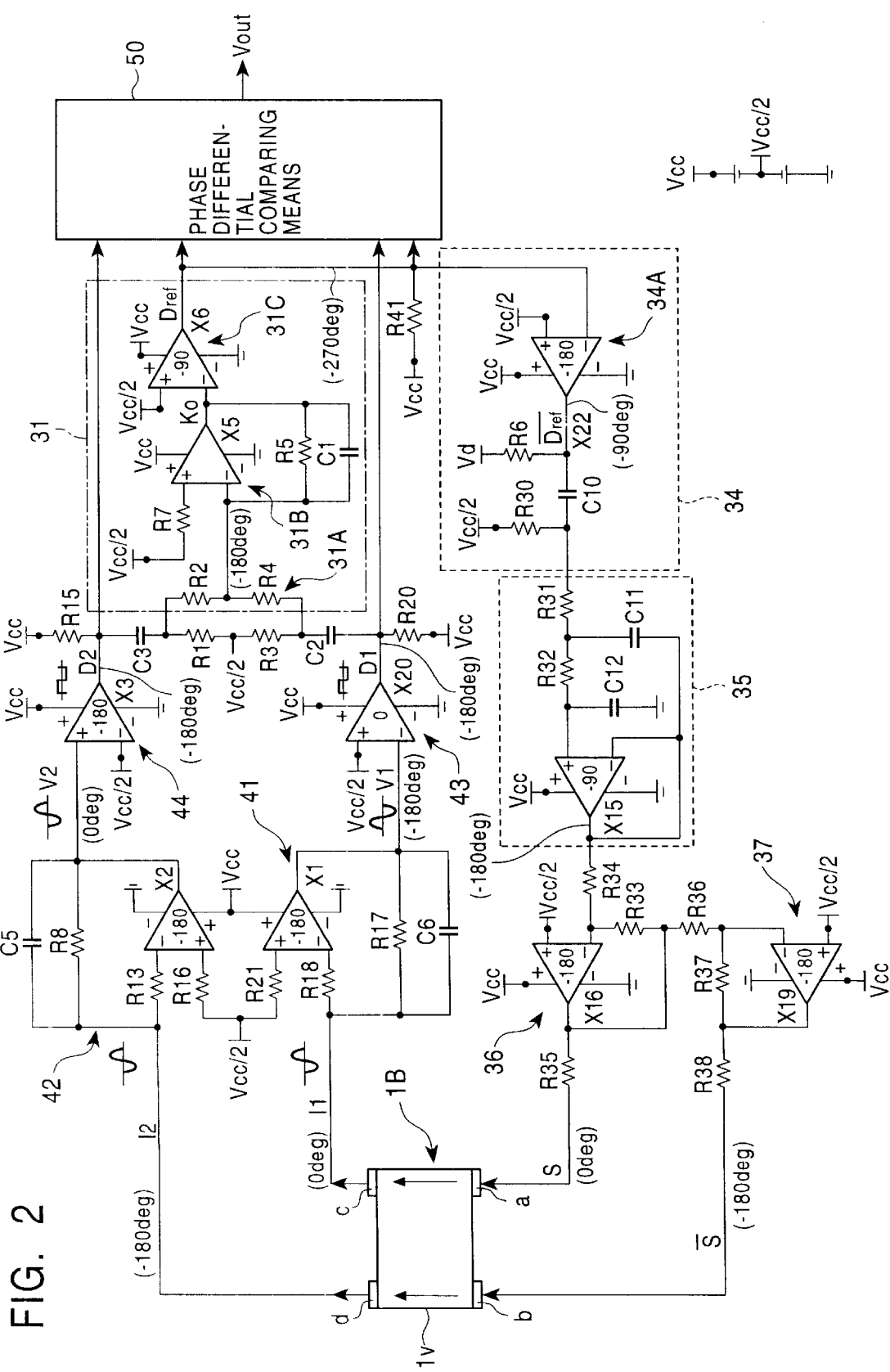
FIG. 2 is a circuit constructional diagram showing the detail of the block constructional diagram in FIG. 1.
Figure 3:
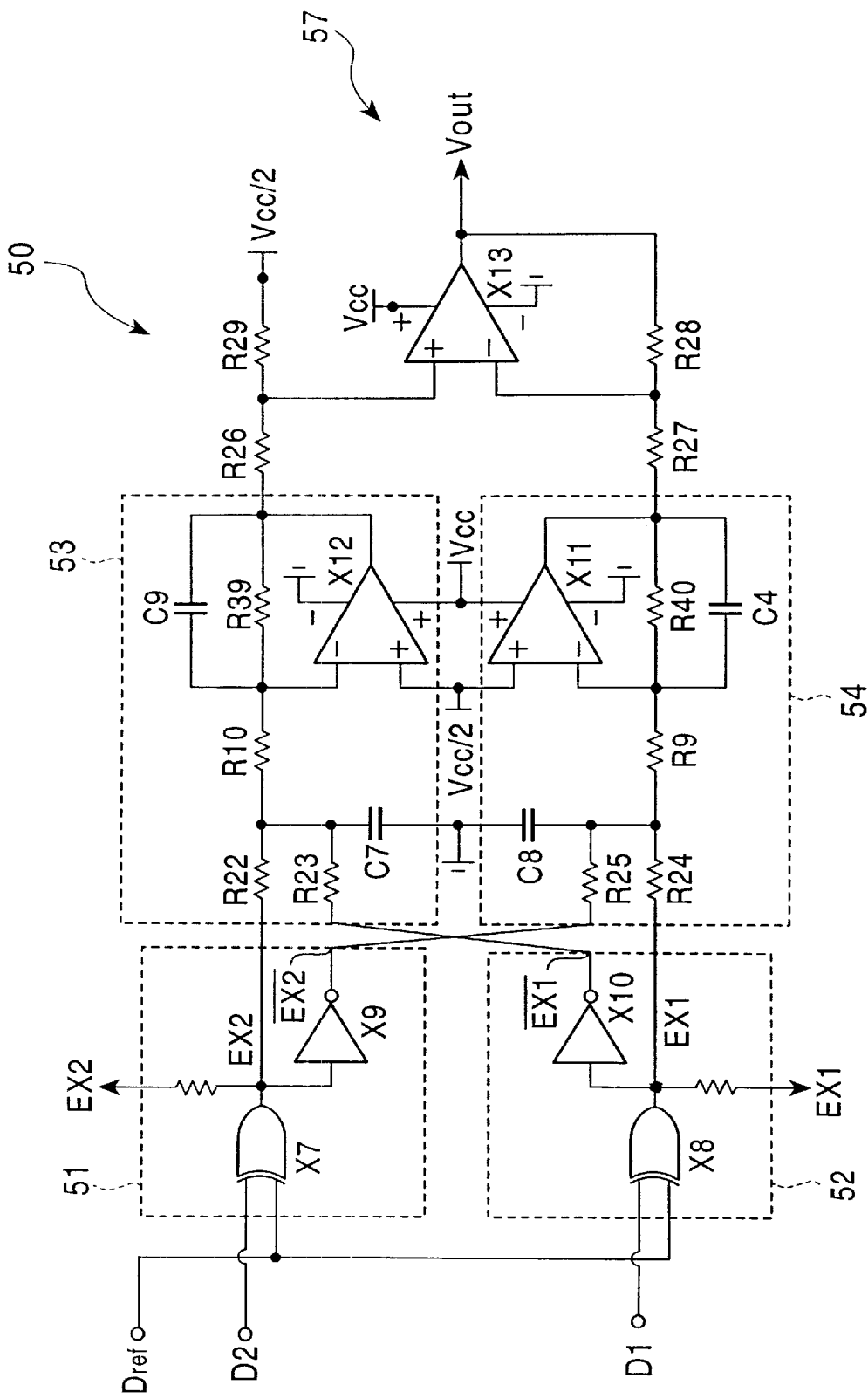
FIG. 3 is a circuit constructional diagram showing the detail of phase differential detecting means.

FIG. 1 is a block constructional diagram in case of a piezoelectric vibrator of the same polarizing type as an embodiment of a driving apparatus of a piezoelectric vibrator for a gyroscope according to the present invention, FIG. 2 is a circuit constructional diagram showing the detail of the block constructional diagram in FIG. 1, and FIG. 3 is a circuit constructional diagram showing the detail of phase differential detecting means.

Figure 18:
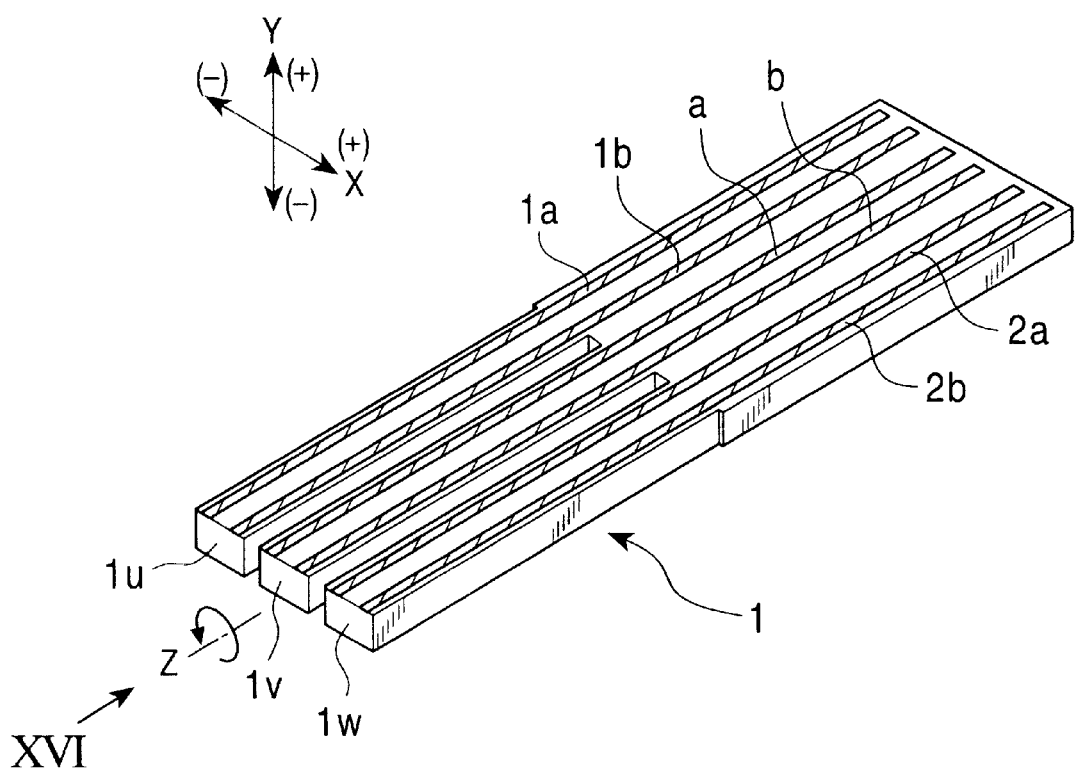
FIG. 18 is a perspective view showing a piezoelectric vibrator of a three-leg tuning fork type used for a gyroscope.
Figure 19:
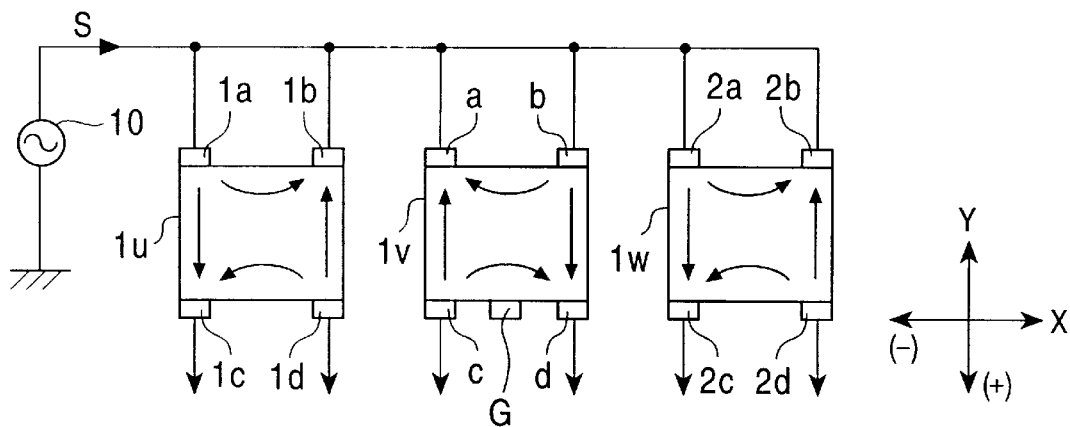
FIG. 19 is one constructional example of an end surface of a piezoelectric vibrator and a front view thereof in the view of a direction of an arrow (XVI) in FIG. 18.
Figure 20:
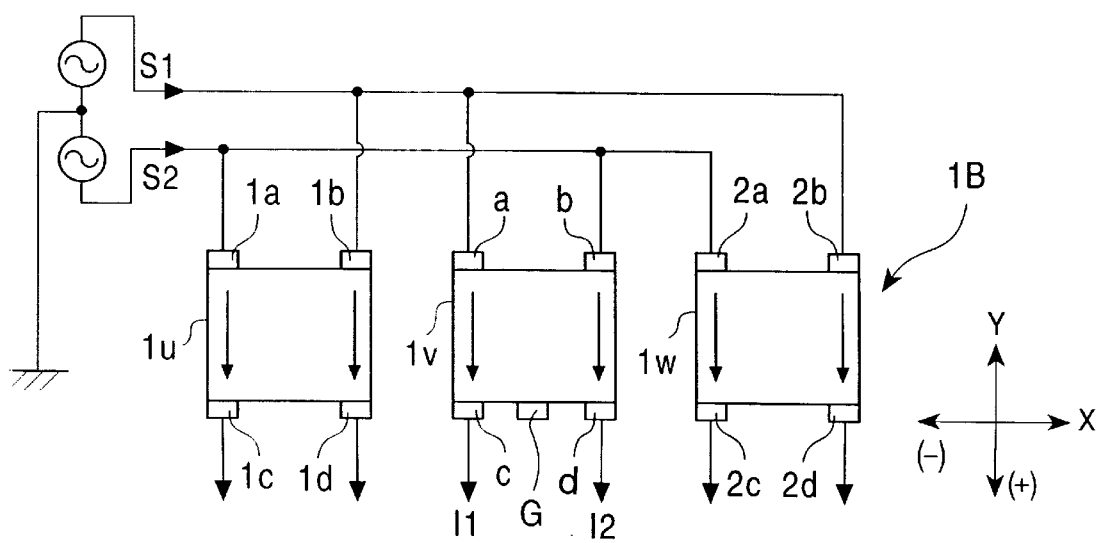
FIG. 20 is a front view showing another constructional example of the end surface of the piezoelectric vibrator.
Figure 21A:
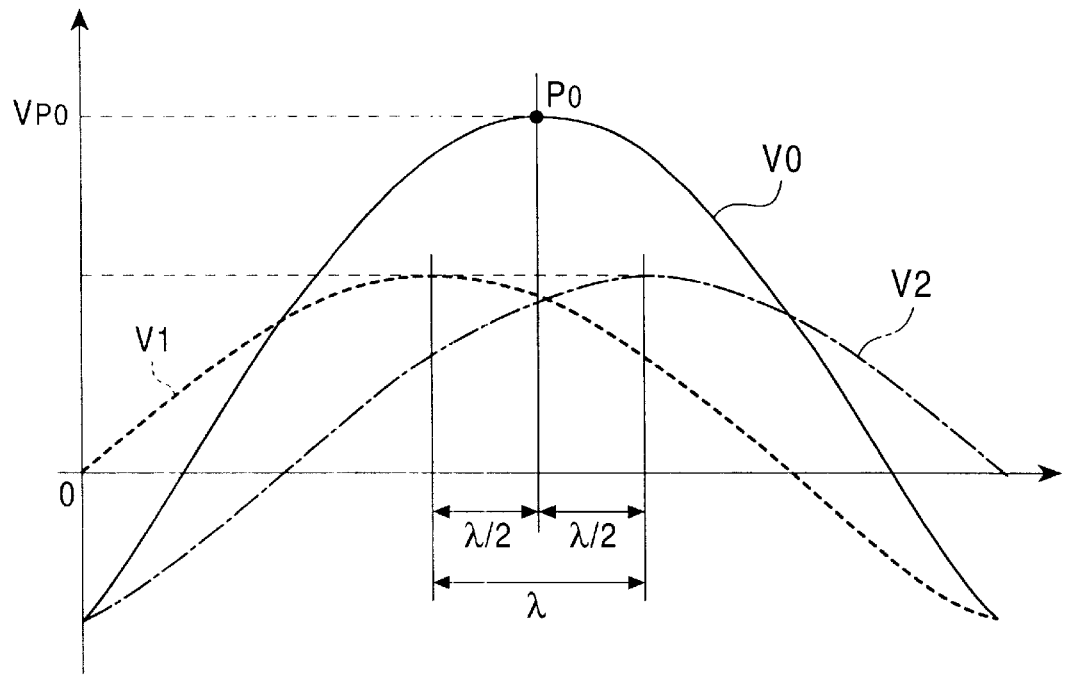
FIGS. 21(A) and 21(B) are diagrams using conventional methods of obtaining the median of a phase differential between two voltage outputs.
Figure 21B:
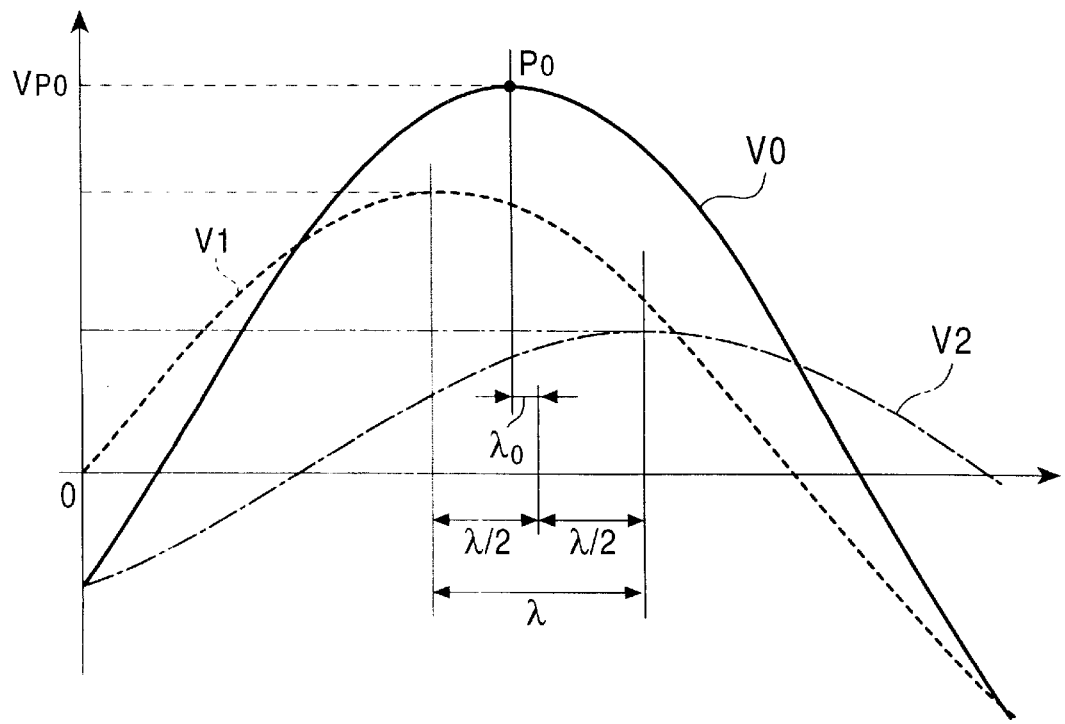

Referring to the block constructional diagram shown in FIG. 1, a range surrounded by reference numeral 30 denotes a driving system; a range surrounded by reference numeral 40 a detecting system; and a part surrounded by reference numeral 50 phase differential detecting means. It is noted that the piezoelectric vibrator (piezoelectric tuning fork) is the same polarizing type as that of the conventional piezoelectric vibrator 1B. That is, dielectric polarizing directions of the vibrating legs are wholly formed in the same direction. The drive electrodes 1a, 1b, a, b, 2a, and 2b are formed on one surface of the vibrating legs 1u, 1v, and 1w, and the output electrodes 1c, id, c, d, 2c, and 2d are formed on another surface of the vibrating legs 1u, 1v, and 1w (refer to FIG. 18 and FIG. 20). The earth electrode G, which is conventionally formed at the center on the detecting side of the center vibrator 1v, is deleted. Incidentally, FIG. 2 shows only the center vibrating leg 1v among the three vibrating legs 1u, 1v, and 1w of the piezoelectric vibrator 1b.

As shown in FIG. 1, the driving system 30 comprises: phase shifting means 31; amplitude control means 34; a low-pass filter 35; driving means 36; and inverse driving means 37. The detecting system 40 comprises: I/V converting means 41 and 42; and binarizing means 43 and 44. The phase differential detecting means 50 further comprises: phase comparing means 51 and 52; low-pass filters 53 and 54; and differential amplifying means 57.

The drive electrodes 1a, b, and 2a of the three vibrating legs 1u, 1v, and 1w of the piezoelectric vibrator 1 are connected to the driving means 36, and the remaining drive electrodes 1b, a, and 2b are connected to the inverse driving means 37. The output electrodes Ic, id, 2c, and 2d of the vibrating legs 1u and 1w on the both sides are connected to a reference potential (e.g., $V_{cc}/2$: $V_{cc}$ is a power voltage, not shown). As shown in FIG. 2, the output electrodes c and d on the center are connected to the I/V converting means 41 and 42, respectively.

The next description turns to the detecting system 40. As shown in FIG. 2, the I/V converting means 41 and 42 as a first stage of the detecting system 40 comprises an operational amplifier, etc. mainly. The current output (first current output) I1 and the current output (second current output) I2, which flow from the output electrodes c and d of the center vibrating leg 1v and are like sine waves, are converted into the voltage outputs V1 and V2 like sine waves. The binarizing means 43 and 44 comprises a comparator using an operational amplifier, etc. FIG. 2 shows comparators X3 and X20 of what is called a level detecting type. Note that output parts of the comparators X3 and X20 comprising the binarizing means 43 and 44 are open collector type, so that the output terminals are connected to the power voltage $V_{cc}$ via resistors R15 and R20.

The binarizing means 43 and 44 converts the voltage outputs V1 and V2 like sine waves into the digital outputs D1 and D2 like rectangular waves (digital waves) having pulse widths proportional to the pulse widths of the voltage outputs V1 and V2. The binarizing means 43 comprises a comparator of a forward type, which operates to output the "H" level signal if the voltage output V1 crosses the threshold level ($V_{cc}/2$) to a direction from the negative to the positive and to output the "L" level signal if the voltage output V1 crosses the threshold level ($V_{cc}/2$) to a direction from the positive to the negative. The binarizing means 44 comprises a comparator of an inverse type, which operates to output the "L" level signal if the voltage output V2 crosses the threshold level ($V_{cc}/2$) to a direction from the negative to the positive and to output the "H" level signal if the voltage output V2 crosses the threshold level ($V_{cc}/2$) to a direction from the negative to the positive. In other words, the binarizing means 44 and 43 executes an operation of an opposite polarization.

The next description turns to the driving system 30. As shown in FIG. 2, the phase shifting means 31 comprises an adder 31A; an integrator 31B; and a binarizing circuit 31C.

The adder 31A comprises resistors R2 and R4. Coupling capacitors C2 and C3 are provided between the output terminal of the binarizing means 43 and the resistor R4, and between the output terminal of the binarizing means 44 and the resistor R2, respectively, and a DC voltage component is cut. Therefore, the adder 31A adds voltages having AC components of the digital outputs D1 and D2 on the reference potential $V_{cc}/2$, which are biased newly via resistors R1 and R3 in an analog manner. The integrator 31B comprises an operational amplifier X5, etc. mainly. The resistors R2 and R4 constructing the adder 31A, other resistors R5 and R7, the capacitor C1, and the like are connected to the integrator 31B. A signal like a rectangular wave obtained by adding the digital outputs D1 and D2 in an analog manner is inputted to an inverse terminal (minus terminal) of the integrator 31B. The inputted signal is converted into an output like a triangular wave (triangular wave output) K0 by the integrator 31B. The binarizing circuit 31C is provided for the post stage of the integrator 31B. The binarizing circuit 31C comprises a comparator X6 of a forward type, similarly to the binarizing circuit 43, and generates the reference signal $D_{ref}$ (digital signal) having the H-level signal and the L-level signal, with reference to the threshold level $V_{cc}/2$ from the triangular wave output K0 outputted from the integrator 31B. Note that an output part of the comparator X6 constructing the binarizing circuit 31C is an open collector type, so that the power voltage $V_{cc}$ is applied to the output terminal of the comparator X6 via a resistor R41.

The amplitude control means 34 comprises inverting means 34A and a coupling capacitor C10. The inverting means 34A has the same construction as that of the binarizing means 44 of the inverse type. A bias voltage $V_d$ is applied to the output terminal of the inverse type via a resistor R6. The reference signal $D_{ref}$ inverted by the inverting means 34A becomes an inverse reference signal $/D_{ref}$ which sets the ground potential (0V) to the L-level and the bias voltage $V_d$ to the H-level. The coupling capacitor C10 cuts a DC voltage component from the inverse reference signal $/D_{ref}$. The output side of the coupling capacitor C10 is connected to the reference potential $V_{cc}/2$ via a resistor R30. The inverse reference signal $/D_{ref}$ is set to a digital signal output, which sets the reference potential $V_{cc}/2$ to the center.

The low-pass filter 35 is a secondary low-pass filter of a Butterworth type of a gain 1. The phase of the inverse reference signal $/D_{ref}$, which is outputted from the amplitude control means 34, is delayed by (−90) deg, and the rectangular wave is also restored to the triangular wave.

Both the driving means 35 and inverse driving means 37 comprise inverse amplifiers X16 and X19. A sine value output from the low-pass filter 35 is inputted to the driving means 36 and then an output of the driving means 36 is inputted to the inverse driving means 37.

An output of the driving means 36 is connected to the drive electrode a of the piezoelectric vibrator 1B via a resistor R35. On the other hand, an output of the inverse driving means 37 is connected to the drive electrode b of the center vibrating leg 1ν via a resistor R38.

Incidentally, the resistors R35 and R38 are resistors for compensation, when changing the temperature corresponding to a DC resistance of an internal impedance in the piezoelectric vibrator 1B.

Next, the phase differential detecting means 50 is described. As shown in FIG. 3, the phase comparing means 51 and 52 at the first stage of the phase differential detecting means 50 comprises an Exor gate X7 having an exclusive OR output, a NOT circuit X9, an Exor gate X8, and a NOT circuit X10, respectively. The digital outputs D2 and D1 are inputted to one input terminal of the Exor gate X7 and one input terminal of the Exor gate X8, respectively. The reference signals $D_{ref}$ are inputted to another input terminal of the Exor X7 and another input terminal of the Exor gate X8, respectively. A part of an output EX2 of the Exor gate X7 is connected to the NOT circuit X9. An output /EX2 of the NOT circuit X9 is connected to an output EX1 of the other Exor gate X8 via resistors R25 and R24. Similarly, a part of the output EX1 of the Exor gate X8 is connected to the NOT circuit X10, and an output /EX1 of the NOT circuit X10 is connected to the output EX2 of the Exor gate X7 via resistors R23 and R22.

The low-pass filter 53 comprises: a low-pass filter (integrator) of a passive type having the resistors R22 and R23, and a capacitor C7; operational amplifying means X12 such as an operational amplifier mainly; and a low-pass filter of an active type, to which resistors RIO and R39 and a capacitor C9, are connected. Similarly, the low-pass filter 54 comprises: a low-pass filter of the passive type having the resistors R24 and R25 and a capacitor C8 and operational amplifying means X11 mainly; and a low-pass filter of the an active type, to which resistors R9 and R40 and a capacitor C4 are connected.

The differential amplifying means 57 comprises operational amplifying means X13 such as an operational amplifier, mainly. Resistors R26, R27, R28, and R29 are connected to the differential amplifying means 57.

The description turns to the operation of a control apparatus of the piezoelectric vibrator for the gyroscope.

When the piezoelectric vibrator 1B is vibrated in the X-direction, the current outputs I1 and I2 whose initial phase differential is 180 deg are outputted from the output electrodes c and d of the center vibrating leg 1ν. The dielectric polarizing directions are the same in the vibrating leg 1ν of the piezoelectric vibrator 1B, so that the current outputs I1 and I2 have an opposite polarity each other.

If the piezoelectric vibrator 1b is vibrated in the X-direction and is disposed in the rotational system round a Z-axis direction, there is caused a phase differential λ which is proportional to Coriolis force generated by the rotation between the current outputs I1 and I2. Note that in the following, it is assumed that the current outputs I1 and I2 have the same polarity (initial phase differential =0 deg) and the median λ/2 of the phase differential λ generated between both of them due to the rotation is set to a reference point (0 deg) of the phase.

The current outputs I1 and I2 are converted into the voltage outputs V1 and V2 in the I/V converting means 41 and 42. The I/V converting means 41 and 42 invert the phases of the current outputs I1 and I2 by 180 deg and outputs the inverted phases. The phase of the voltage output V1 is deviated by −180 deg from the reference point (0 deg) of the phase at this point. The phase of the voltage output V2 is also deviated by −180 deg, so that the phase of the voltage output V2 has the same phase of the reference point (0 deg) of the phase.

The binarizing circuits 43 and 44 convert the voltage outputs V1 and V2 of the I/V converting means 41 and 42 into the digital outputs D1 and D2. As stated above, the binarizing circuits 43 and 44 convert signals into the digital outputs D1 and D2 having pulse widths proportional to pulse widths of the sine waves. A comparator X20 of the binarizing means 43 is a forward type and a comparator X3 of the binarizing means 44 is an inverse type. At this point, the phase of the digital output D1 is equal to (−180 deg) as it is with reference to the reference point (0 deg) of the phase, the phase of the digital output D1 is equal to 0+(−180)=−180 deg, and the digital outputs D1 and D2 have the same polarity. Incidentally, the phase differential $\lambda$ generated due to the rotation exists between the digital outputs D1 and D2.

Figure 4:
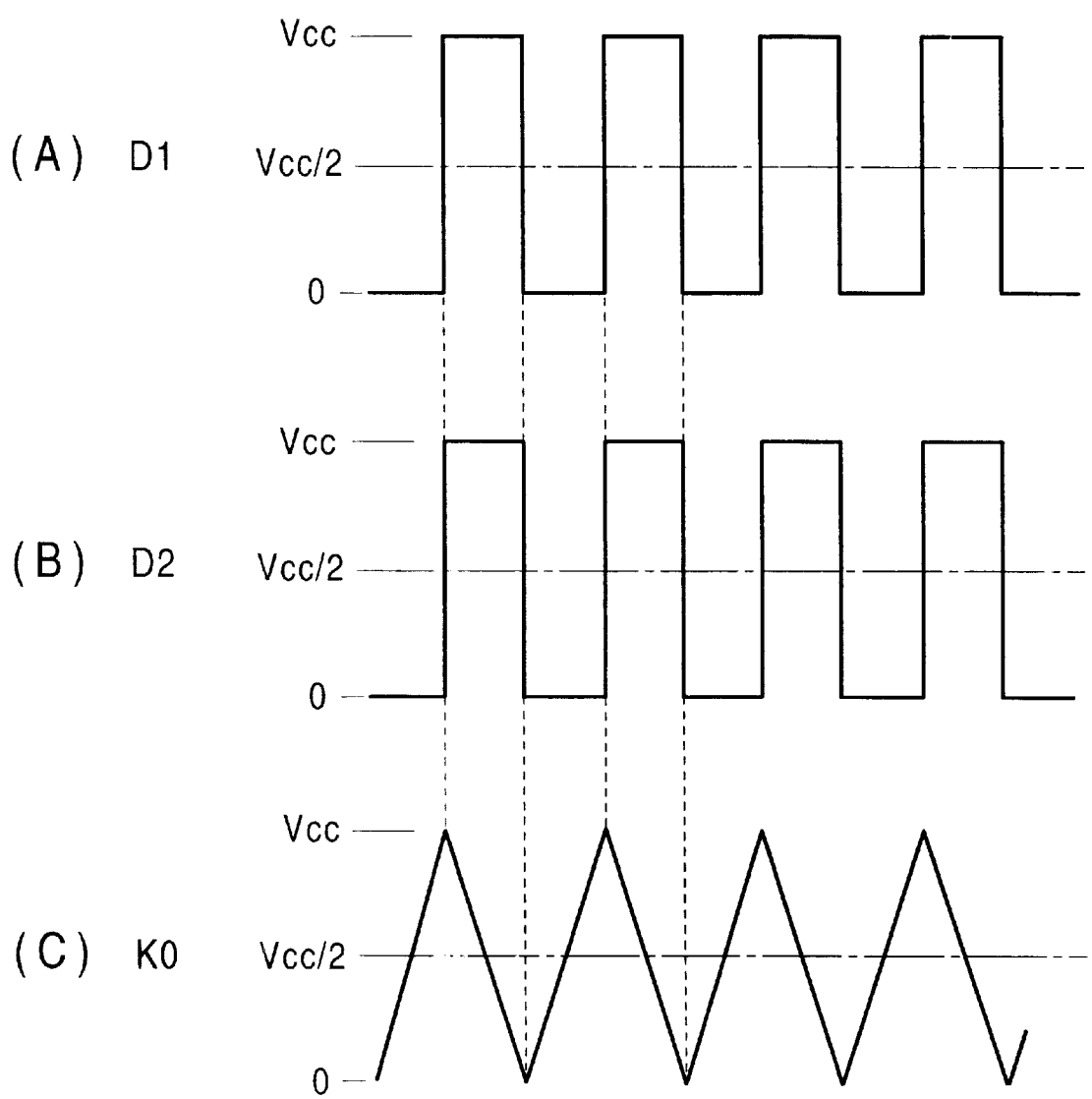
FIGS. 4(A) to 4(c) are timing charts for an input signal and an output signal of the phase shifting means when a phase differential between digital outputs D1 and D2 is equal to 0, FIG. 4(A) indicates the digital output D1, FIG. 4(B) the digital output D2, and FIG. 4(C) an output K0 of the phase shifting means.
Figure 5:
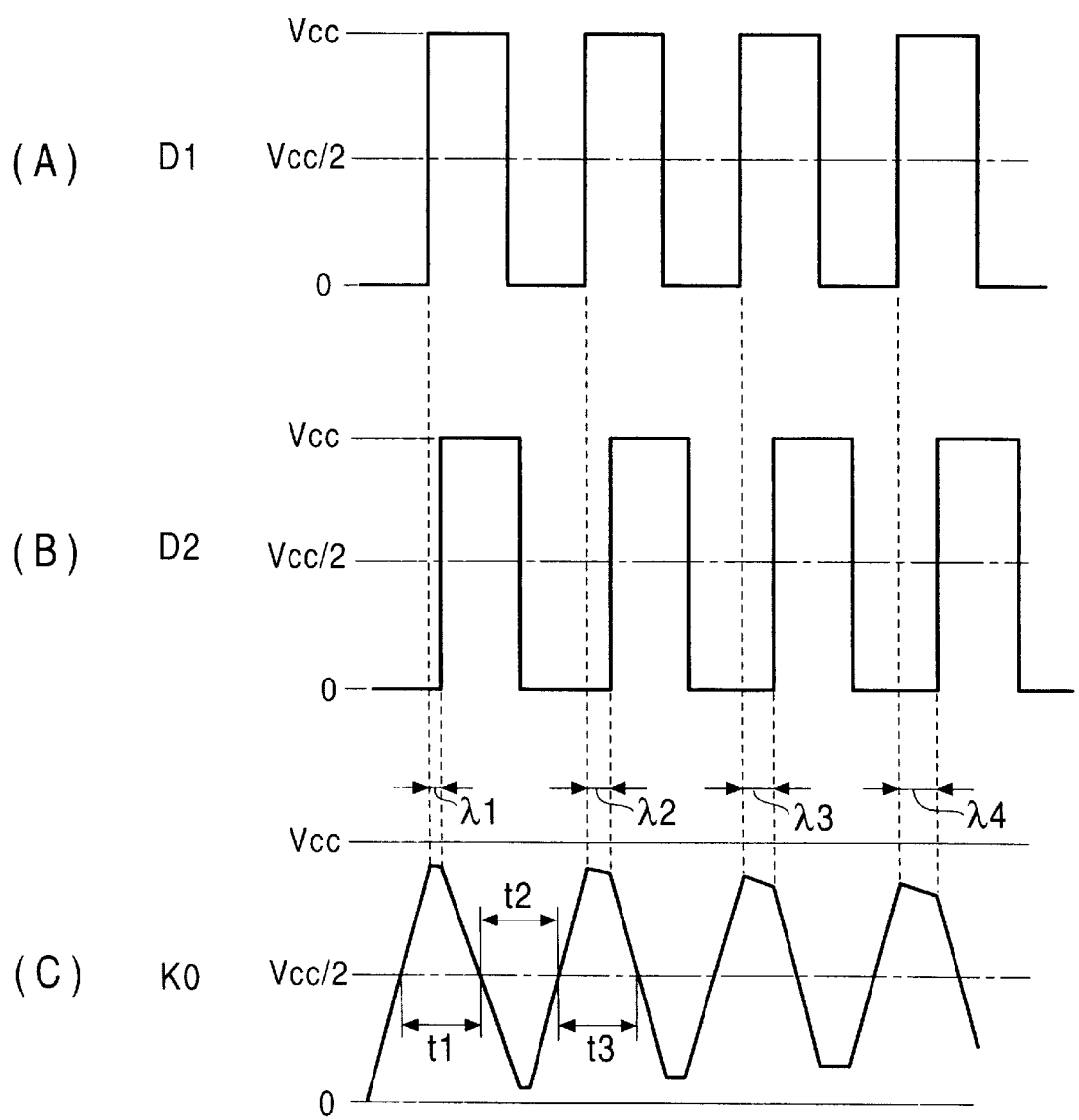
FIGS. 5(A) to 5(C) are timing charts of an input signal and an output signal of the phase shifting means when gradually increasing the phase differential between the digital outputs D1 and D2.
Figure 6:
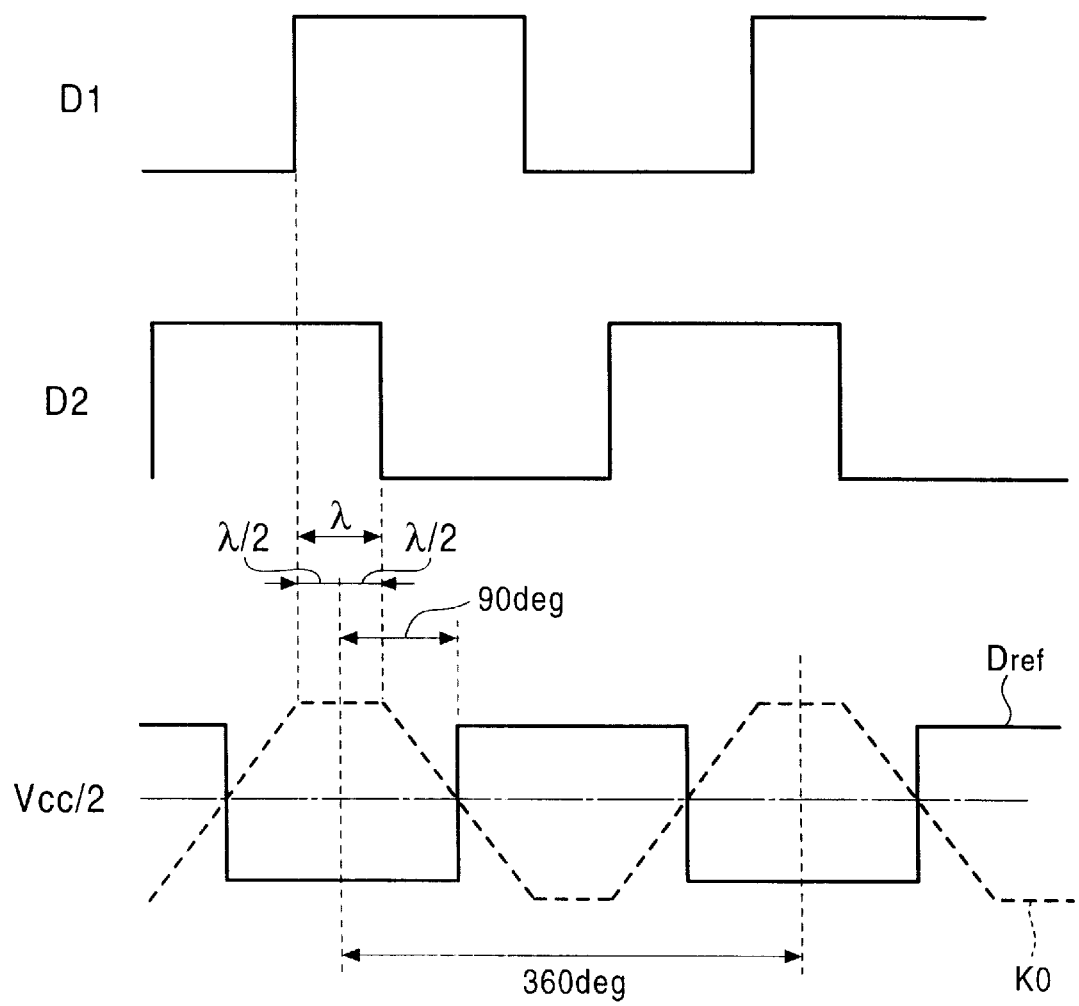
FIG. 6 is a diagram showing a relationship between the median of the phase differential and the reference signal.

FIGS. 4(A) to 4(C) and FIGS. 5(A) to 5(C) show a timing of an input signal and an output signal of the phase shifting means 31; FIGS. 4(A) to 4(C) show cases wherein the phase differential between the digital outputs D1 and D2 is equal to 0; and FIGS. 5(A) to 5(C) show cases of gradually increasing the phase differential between the digital outputs D1 and D2. It is noted that FIG. 4(A) and FIG. 5(A) indicate the digital output D1; FIG. 4(B) and FIG. 5(B) the digital output D2; and FIG. 4(C) and FIG. 5(C) the output K0 of the phase shifting means. FIG. 6 is a diagram showing a relationship between the median of the phase differential and the reference signal.

As shown in FIGS. 4A, 4B, and 4C, when the phase differential $\lambda$ between the digital outputs D1 and D2 is equal to 0, a voltage obtained by adding the digital outputs D1 and D2 is integrated and thus the output K0 of the integrator 31B has a triangular wave vibrating on the basis of the reference potential $V_{cc}/2$ as the center. As shown in FIGS. 5A, 5B, and 5C, when the phase differential k (=X1, $\lambda$2, $\lambda$3, and $\lambda$4 . . . ) occurs between the digital output D1 and D2, this causes a trapezoidal wave that apexes of the triangular wave are crushed by time corresponding to the phase differential $\lambda$. As shown in FIG. 5(C), it is understood that as the phase differential $\lambda$ between the digital outputs D1 and D2 is larger, the crushing degree of the triangular wave becomes larger and the amplitude gradually becomes smaller. However, this does not influence time bases t1, t2, t3 . . . when the trapezoidal wave crosses the reference potential $V_{cc}/2$, and it is possible to obtain the exact time bases t1, t2, t3 . . . until the amplitude of the trapezoidal wave is equal to 0.

The binarizing circuit 31C binarizes the output K0 of the integrator 31B, setting the reference potential $V_{cc}/2$ to the threshold level. As explained above, the output K0 of the integrator 31B crosses the threshold level (reference potential $V_{cc}/2$) under the exact time base, so that the reference signal $D_{ref}$, which is outputted from the integrator 31B can, be set to a signal which is deviated by 90 deg from the median $\lambda/2$ of the phase differential $\lambda$ between the current outputs I1 and I2.

If the amplitudes of the current outputs I1 and I2 or the voltage outputs V1 and V2 are changed, this change never influences the pulse widths of the digital outputs D1 and D2, and these pulses always can be set to the pulse widths proportional to the pulse widths of the voltage outputs V1 and V2. When a differential occurs between the pulses of the voltage outputs V1 and V2 in the conventional manner, it is possible to generate the reference signal $D_{ref}$ whose phase is deviated exactly by 90 deg from the median $\lambda/2$ of the phase differential $\lambda$. It is noted that the phase of the reference signal $D_{ref}$ is deviated by −180+(−90)=−270 deg=+90 deg from the reference point of the phase.

The reference signal $D_{ref}$ is transmitted to the phase differential comparing means 50 and the amplitude control means 34, and inverted by the inverting means 34A of the amplitude control means 34. An output (inverse reference signal $/D_{ref}$) of the inverting means 34A is phase-deviated by −270+(180)=−450 deg=−90 deg from the reference point of the phase.

The output (inverse reference signal $/D_{ref}$) of the inverting means 34A is converted into a sine wave by the low-pass filter 35, and this phase is further delayed by 90 deg. Therefore, an output of the low-pass filter 35 is deviated by −90+(−90)=−180 deg from the center of the phase.

The sine wave output by the low-pass filter 35 is inverted by the driving means 36 having an inverse amplifier, and returned to 0 deg (the same phase) as the center point of the phase therefor. The driving means 36 finally gain-controls the phase, and the driving signal S having a predetermined sine wave is generated. The drive signal S is supplied to the drive electrodes 1a, b, and 2a of the piezoelectric vibrator 1B. The inverse driving means further inverts the phase, which is returned to 0 deg, and generates an inverse drive signal /S which is delayed by 180 deg from the center point of the phase. The inverse drive signal /S is supplied to the other drive electrodes 1b, a, and 2b of the piezoelectric vibrator 1B.

The phase differential detecting means 50 shown in FIG. 3 always keeps a 90 deg-phase between the reference signal $D_{ref}$ and the center $\lambda/2$ of the phase differential $\lambda$ of the digital outputs D1 and D2 which are inputted to the Exor gate, thereby generating a digital signal having only a phase differential component between the digital outputs D1 and D2. The generated digital signal is inputted to the low-pass filters 53 and 54 (not shown). Since the low-pass filters 53 and 54 have an integrating function, the digital signal having only the phase differential component is integrated, and smoothed to a DC voltage component in the positive and negative directions. The differential amplifying means 57 differential-amplifies the DC voltage component, and detects an angular velocity output Vout proportional to Coriolis force.

The construction of the phase shifting means 31 also can be shown as follows.

Figure 7:
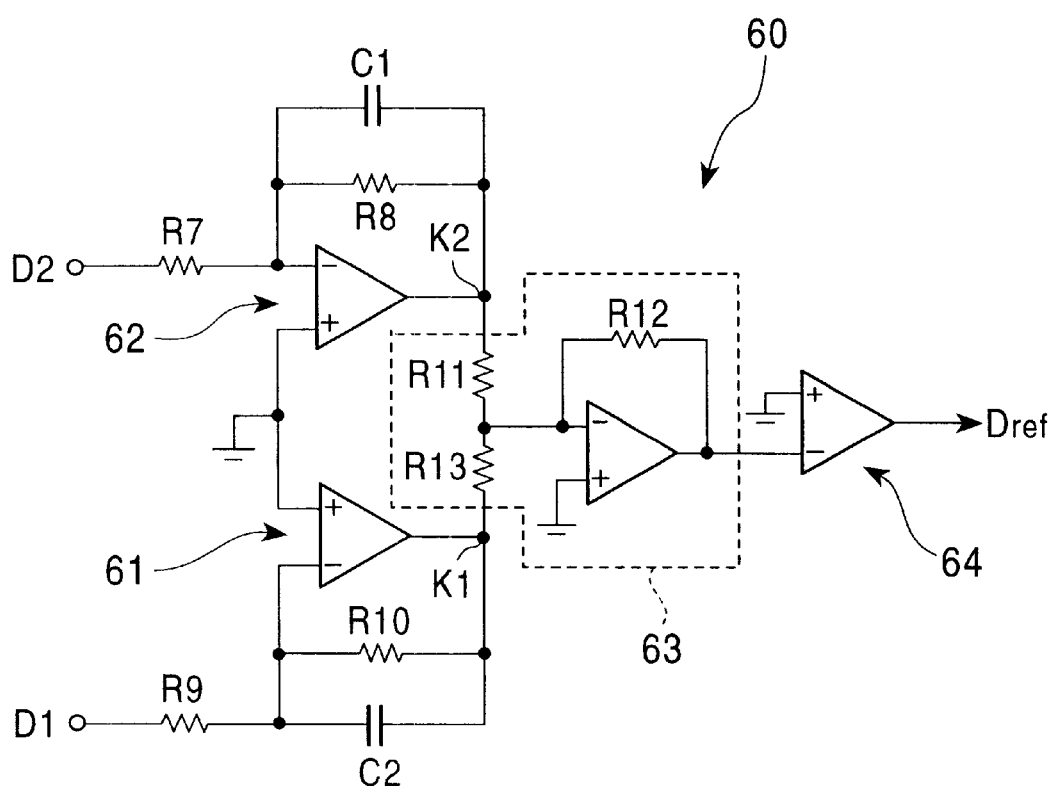
FIG. 7 is a circuit constructional diagram showing another constructional example (second constructional example) of the phase shifting means.

FIG. 7 is a circuit constructional diagram showing another constructional example (second constructional example) of the phase shifting means.

Figure 9:
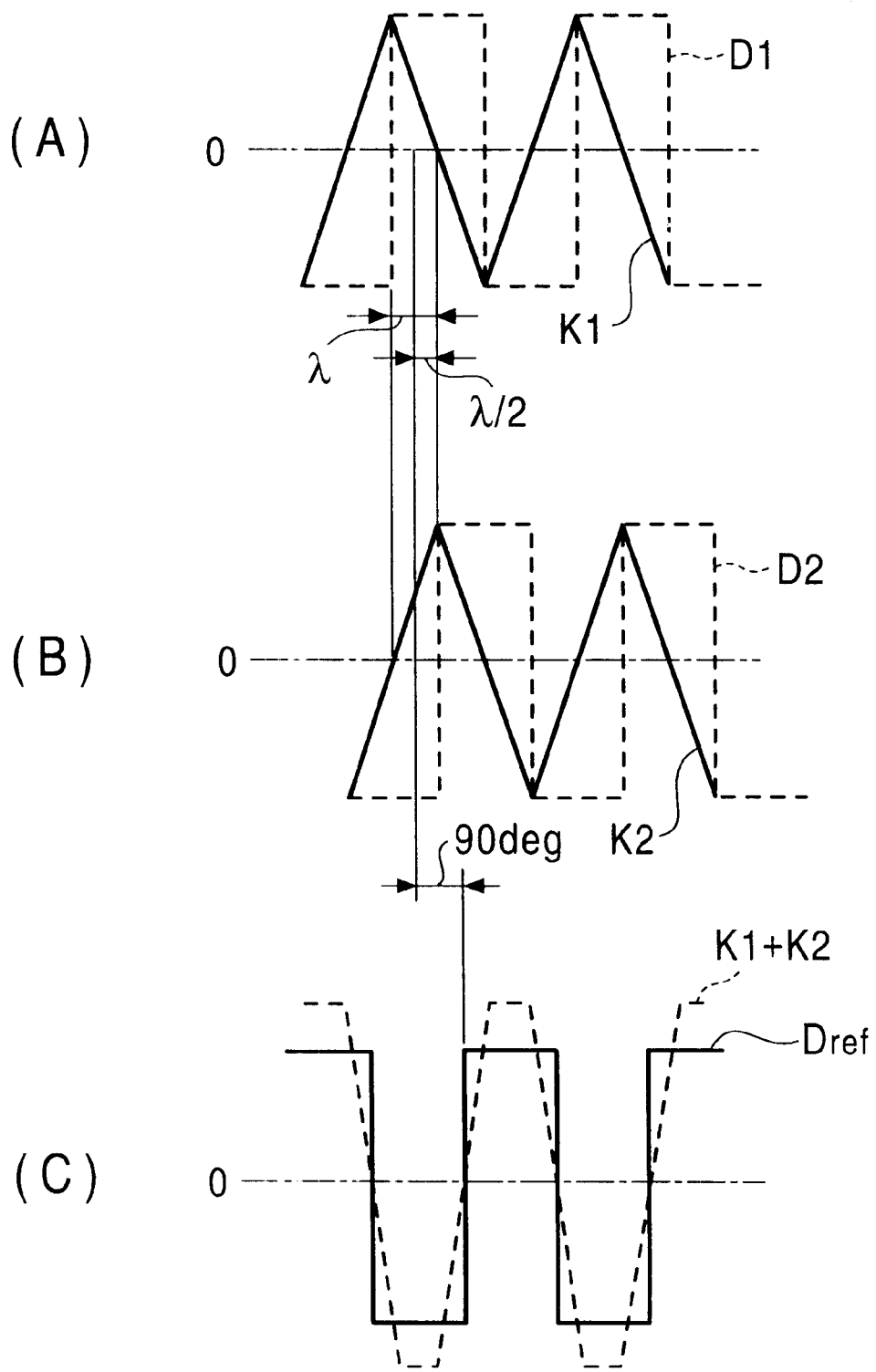
FIGS. 9(A) to 9(C) are diagrams of output waveforms of units when there is no phase differential between the digital outputs D1 and D2.

FIGS. 8(A) to 8(C) show diagrams of output waveforms of units when there is no phase differential between the digital outputs D1 and D2; FIG. 8(A) shows a diagram illustrating an output waveform of one integrator, FIG. 8(B) a diagram showing an output waveform of another integrator, and FIG. 8(C) a diagram showing an output waveform of an adder and a binarizing circuit; and FIGS. 9(A) to 9(C) show diagrams of output waveforms of units when there is no phase differential between the digital outputs D1 and D2; FIG. 9(A) a diagram showing an output waveform of one integrator, FIG. 9(B) a diagram showing an output waveform of another integrator, and FIG. 9(C) a diagram showing an output waveform of an adder and a binarizing circuit.

The digital outputs D1 and D2 are outputted by both the binarizing means 43 of the forward type and the binarizing means 44 of the inverse type, respectively, as shown in FIG. 2, or both D1 and D2 are outputted by the binarizing means of the forward type. Only the phase differential proportional to Coriolis force exists between the digital outputs D1 and D2.

As shown in FIG. 7, phase shifting means 60 comprises: integrators 61 and 62; an adder 63; and a binarizing circuit 64. Both the integrators 61 and 62 have the similar construction, mainly comprise an operational amplifier. The adder 63 is a general adding circuit, which comprises an operational amplifier mainly. The binarizing circuit 64 has a comparator of the forward type which sets a threshold level to 0V.

The digital outputs D1 and D2 are inputted to the integrators 61 and 62. As shown in FIGS. 8A and 8B and FIGS. 9A and 9B, the digital outputs D1 and D2 are converted into outputs K1 and K2 like triangular waves, respectively.

The adder 63 adds the outputs K1 and K2 of the integrators 61 and 62 in an analog manner, and to thereby obtain an additional output (K1+K2) as shown by FIG. 8(C) and FIG. 9(C).

That is, if there is no phase differential between the digital outputs D1 and D2, the additional output (K1+K2) is obtained as shown by a broken line in FIG. 8(C). If there is a phase differential $\lambda$ between the digital outputs D1 and D2, an additional output (K1−K2) like trapeziums is obtained as shown by a broken line in FIG. 9(C).

The binarizing means 64 converts the additional output (K1+K2) into the reference signal $D_{ref}$ like a rectangular wave. As shown in FIG. 8(C) and FIG. 9(C), the binarizing means 64 converts the additional output (K1+K2) like a triangular wave or a trapezoidal wave into the "H" level signal if the threshold level (0V) crosses from the negative direction to the positive direction, and into the "L" level signal if the threshold level (0V) crosses from the positive direction to the negative direction. The thus-formed reference signal $D_{ref}$ is a rectangular wave output whose phase is delayed by 90 deg from the median $\lambda/2$ of the phase differential $\lambda$ between the digital outputs D1 and D2 (triangular waves or trapezoidal waves). Similarly to the foregoing, if a differential occurs between the amplitudes of the current outputs I1 and I2 (or voltage outputs V1 and V2), it is able to generate the reference signal $D_{ref}$ whose phase is deviated exactly by 90 deg from the median $\lambda/2$ of the phase differential $\lambda$.

Figure 10:
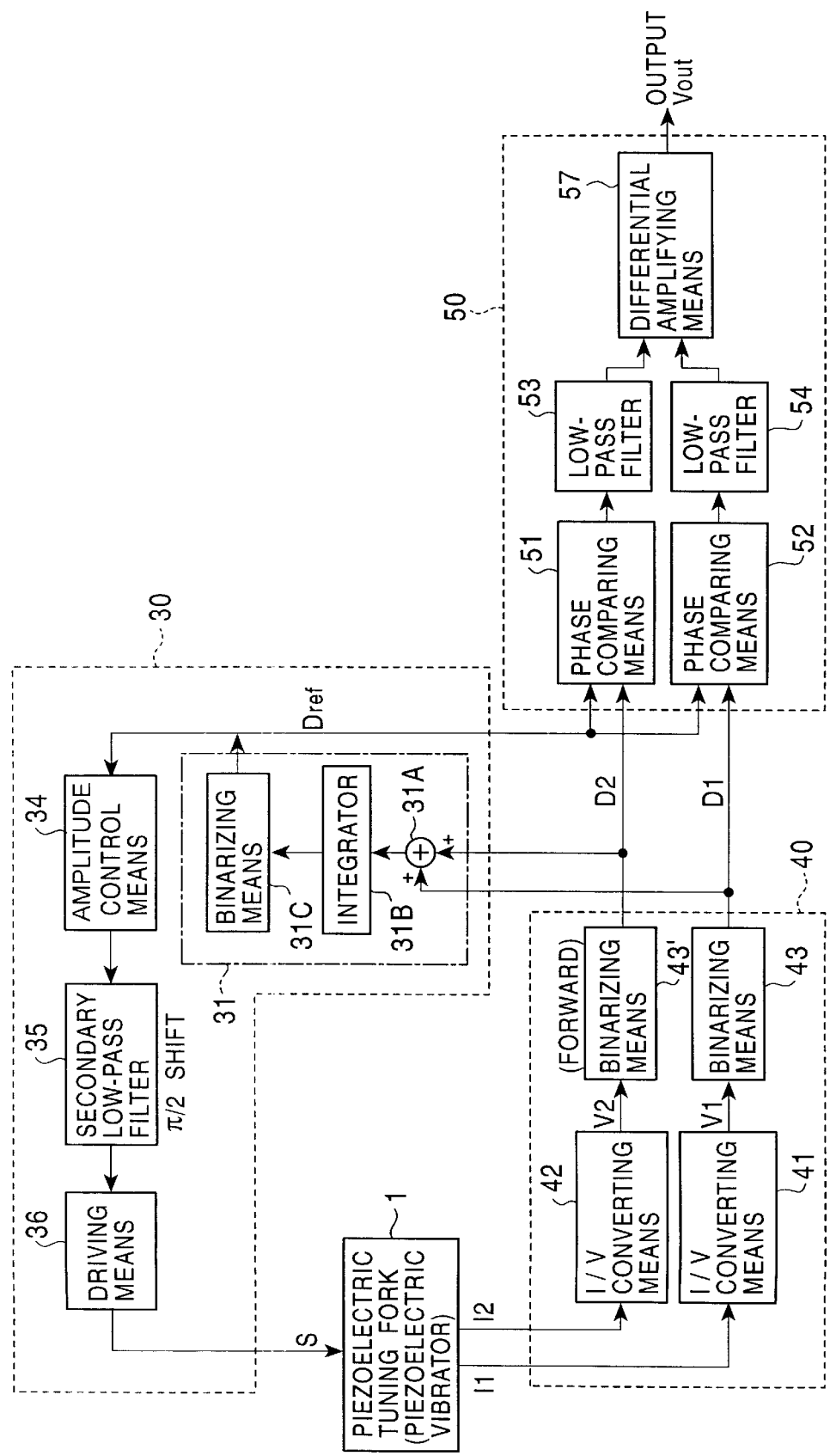
FIG. 10 is a block constructional diagram in the piezoelectric vibrator of the differential polarizing type as another embodiment of the driving apparatus of the piezoelectric vibrator for a gyroscope.
Figure 11:
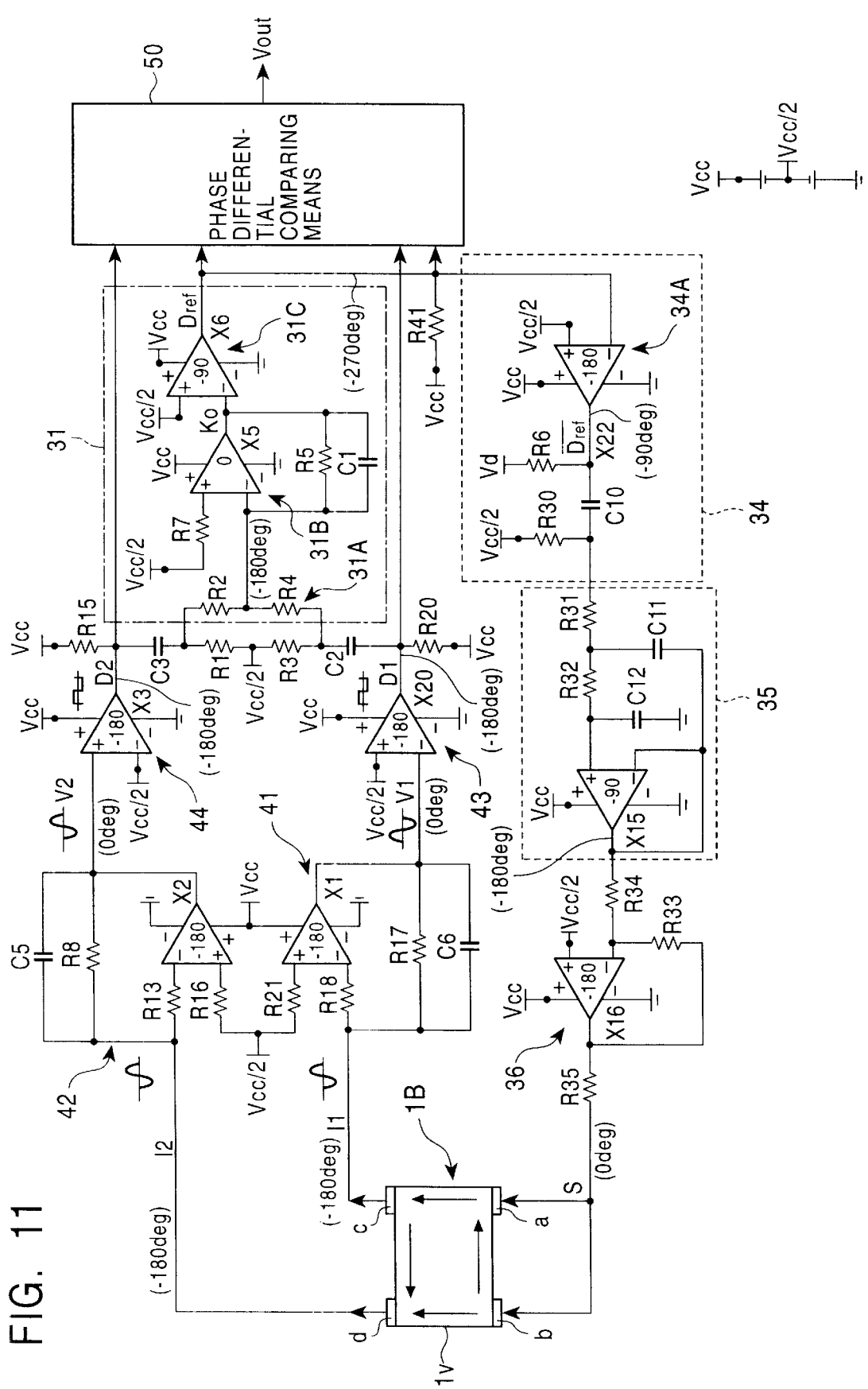
FIG. 11 is a circuit constructional diagram showing the detail of the block constructional diagram in FIG. 10.

FIG. 10 is a block constructional diagram in the piezoelectric vibrator of the differential type as another embodiment of the driving apparatus of the piezoelectric vibrator for the gyroscope according to the present invention, and FIG. 11 is a circuit constructional diagram showing the detail of the block constructional diagram in FIG. 10. Note that only the center vibrating leg 1v is shown in FIG. 11.

In the foregoing, when using the piezoelectric vibrator, of the differential type in place of the piezoelectric vibrator 1B of the same polarizing type, the block constructional diagram and the circuit constructional diagram shown in FIG. 10 and FIG. 11 are obtained. As shown in FIG. 10 and FIG. 11, differently from the block constructional diagram in FIG. 1 and the circuit constructional diagram in FIG. 2, the inverse driving means 37 is unnecessary and the binarizing means 43 of the inverse type is replaced with binarizing means 43' of the forward type. In other words, as shown in FIG. 11, only the same drive signal S is supplied to the drive electrodes a and b of the vibrating leg 1v of the differential type, so that the inverse driving means 37 is not used. The current outputs I1 and I2 of the output electrodes c and d of the center vibrator 1v have the same polarity, and it is therefore unnecessary to invert the voltage output V1 after I/V conversion by using the binarizing means 43 of the inverse type. As a consequence, the binarizing means 43' of the forward type is utilized. It is to be noted that another phase relationship between signals is as same as that as shown in FIG. 2.

Figure 12:
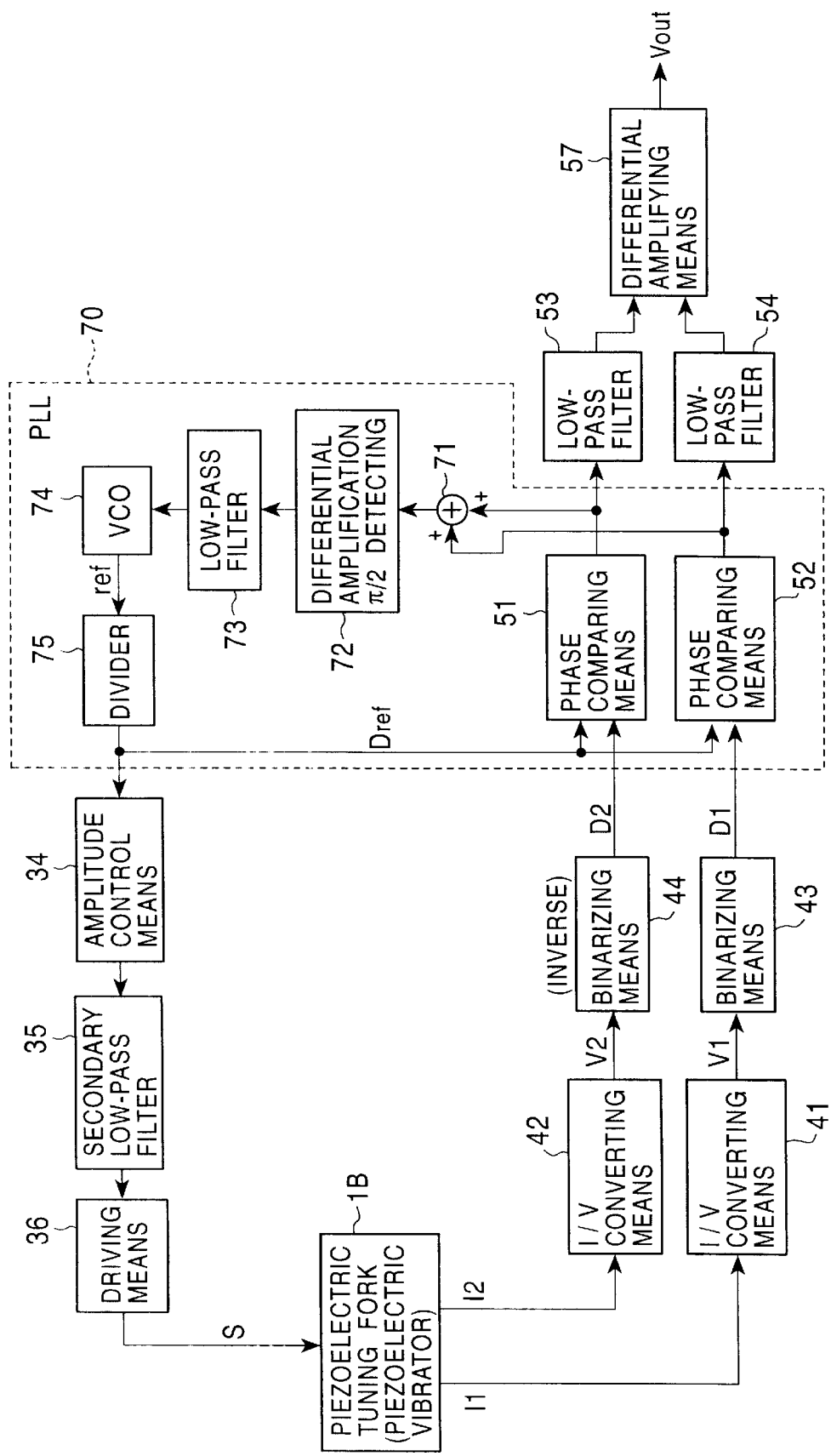
FIG. 12 is a block constructional diagram showing a driving apparatus of a piezoelectric vibrator for a gyroscope using another constructional example (third example) as the phase shifting means.
Figure 13:
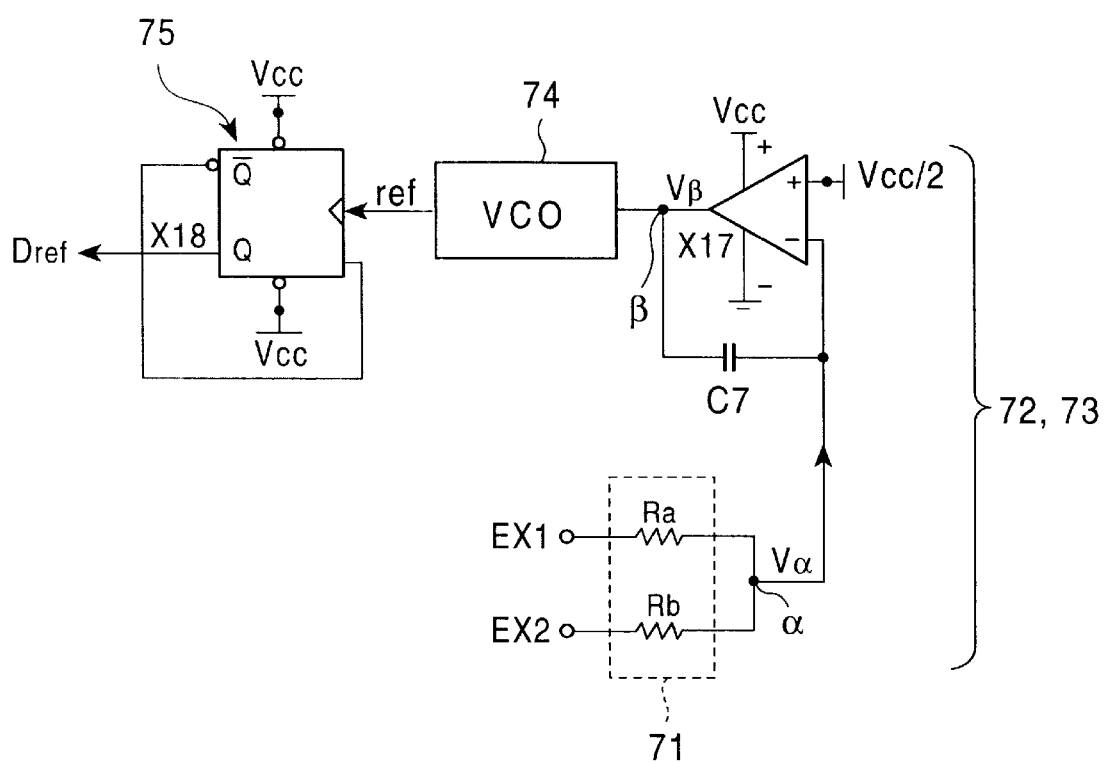
FIG. 13 is a circuit constructional diagram showing the phase shifting means shown in the block constructional diagram in FIG. 12.
Figure 14:
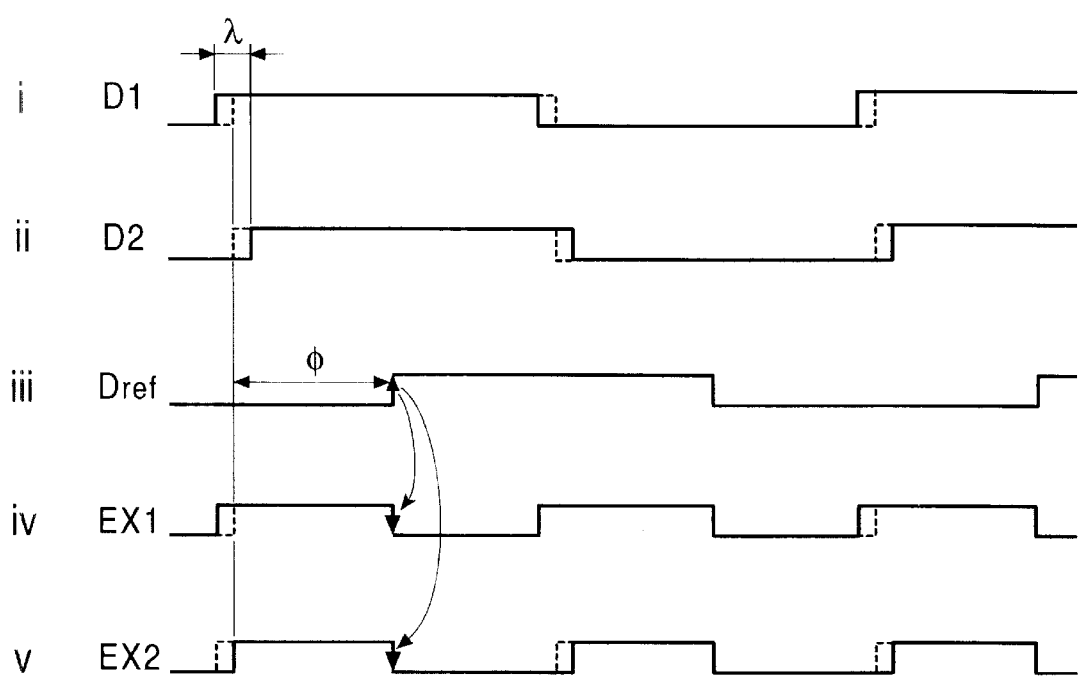
FIG. 14 is a relationship among the digital outputs D1 and D2, a reference signal $D_{ref}$, and outputs EX1 and EX2, i denotes the digital output D1, ii the digital output D2, iii the reference signal $D_{ref}$, iv the output EX1, and v the output EX2.
Figure 15:
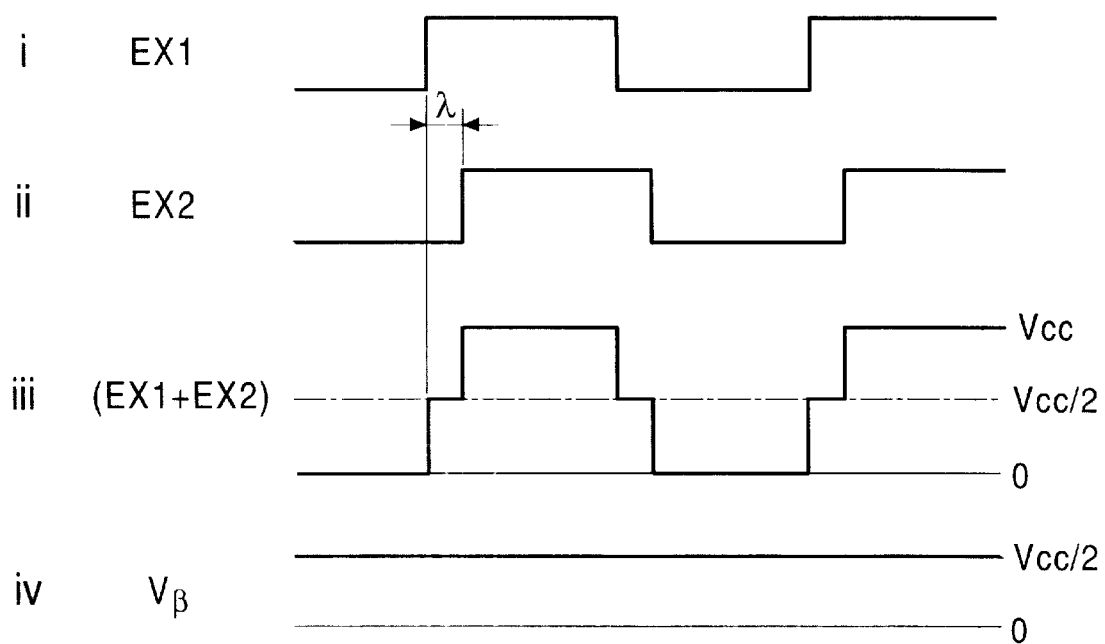
FIG. 15 are waveform outputs of units in circuits shown in FIG. 11, i denotes the output EX1 of the Exor gate X8, II the output EX2 of the Exor gate X7, iii a voltage Vα (=EX1+EX2) at an additional point α in FIG. 11, and iv a control voltage Vβ.

FIG. 12 is a block constructional diagram showing a driving apparatus of a piezoelectric vibrator for a gyroscope using another constructional example (third example) as phase shifting means; FIG. 13 is a circuit constructional diagram showing the phase shifting means shown in the block constructional diagram in FIG. 12; FIG. 14 shows a relationship among the digital outputs D1 and D2, the reference signal $D_{ref}$, and the outputs EX1 and EX2, i denotes the digital output D1, ii the digital output D2, iii the reference signal $D_{ref}$, iv the output EX1, and v the output EX2; and FIG. 15 shows waveform outputs of units of circuits shown in FIG. 11, i denotes the output EX1 of the Exor gate X8, ii the output EX2 of the Exor gate X7, iii a voltage V$\alpha$ (=EX1+EX2) at an additional point $\alpha$ in FIG. 13, and iv a control voltage V$\beta$ of VCO.

Differing from the block constructional diagram in FIG. 1, the piezoelectric vibrator 1 of the differential polarizing type is used, and phase shifting means 70 comprises a PLL (phase lock loop) which has the phase comparing means 51 and 52, an adding unit 71, a differential amplifier 72, a low-pass filter 73, a VCO (voltage control means) 74, and a divider 75 mainly, in the block constructional diagram shown in FIG. 12.

The different points are described in detail hereinbelow.

Since the piezoelectric vibrator 1 of the differential polarizing type is employed in the block constructional diagram shown in FIG. 12, the inverse driving means 37 is removed in the same manner as those in FIG. 10 and FIG. 11, and the binarizing means 44 is the forward type.

With regard to the phase shifting means shown in FIG. 13, the adding unit 71 comprises resistors Ra and Rb, the differential amplifier 72 and low-pass filter 73 comprises the resistors Ra and Rb and an integrator having the capacitor C7 and an operational amplifier X17, and the divider 75 comprises an arithmetic circuit X18 such as a flip flop.

FIG. 14 shows a relationship among the digital outputs D1 and D2, a reference signal $D_{ref}$, and outputs EX1 and EX2.

That is, the outputs EX1 and EX2 are exclusive OR outputs of the digital output D1 and reference signal $D_{ref}$ and the digital output D2 and reference signal $D_{ref}$, and inverted at a timing of the switching the digital output D1 and D2 or the reference signal $D_{ref}$. Therefore, the outputs EX1 and EX2 become outputs which have frequencies as twice that of the digital outputs D1 and D2. A phase differential +between the reference signal $D_{ref}$ and the median $\lambda/2$ of the phase differential $\lambda$ of the outputs EX1 and EX2 is kept as the phase $\phi$ between the reference signal $D_{ref}$ and the median $\lambda/2$ of the phase differential $\lambda$ of the digital outputs D1 and D2.

The outputs EX1 and EX2 of the Exor gates X8 and X7 shown in FIG. 3 are inputted to the resistors Ra and Rb in the adding unit 71. If inputting the outputs EX1 and EX2 shown by i and ii in FIG. 14 to the resistors Ra and Rb, the additional point V$\alpha$ at the additional point $\alpha$ in FIG. 13 is conceptually equal to EX1+EX2 as shown by iii in FIG. 13

($V\alpha$=EX1 and EX2). The operational amplifier 17 compares the reference voltage $V_{cc}/2$, which is inputted to the non-inverse terminal (plus terminal), with the additional voltage $V\alpha$, which is inputted to the inverse terminal (minus terminal). Thus, an output $V\beta$ at an output point $\beta$ of the operational amplifier X17 becomes a DC voltage obtained by integrating and smoothing the output with reference to the reference potential $V_{cc}/2$, as shown by iv in FIG. 15, thereby inputting the DC voltage $V\beta$ to the VCO 74. The DC voltage $V\beta$ functions as a control voltage $V\beta$ of the VCO 74, and the VCO 74 operates to lock the apparatus when an oscillation signal ref is deviated exactly by 90 deg ($\phi$+=90 deg) from the median $\lambda/2$ of the phase differential $\lambda$ between the outputs EX1 and EX2.

The oscillation signal ref of the VCO 74 is divided into ½ by the divider 75, and outputted to the amplitude control means 34 and the phase differential detecting means 50 as the reference signal $D_{ref}$ (refer to FIG. 14) having the same frequency as those of the digital outputs D1 and D2. In other words, the PLL always operates to cause the phase differential $\phi$ of 90 deg between the reference signal $D_{ref}$ and the median $\lambda/2$ of the phase differential $\lambda$ of the outputs EX1 and EX2. Accordingly, it is capable of always keeping the phase differential $\phi$ between the reference signal $D_{ref}$ and the median $\lambda/2$ of the phase differential $\lambda$ of the digital outputs D1 and D2 to 90 deg.

Figure 16:
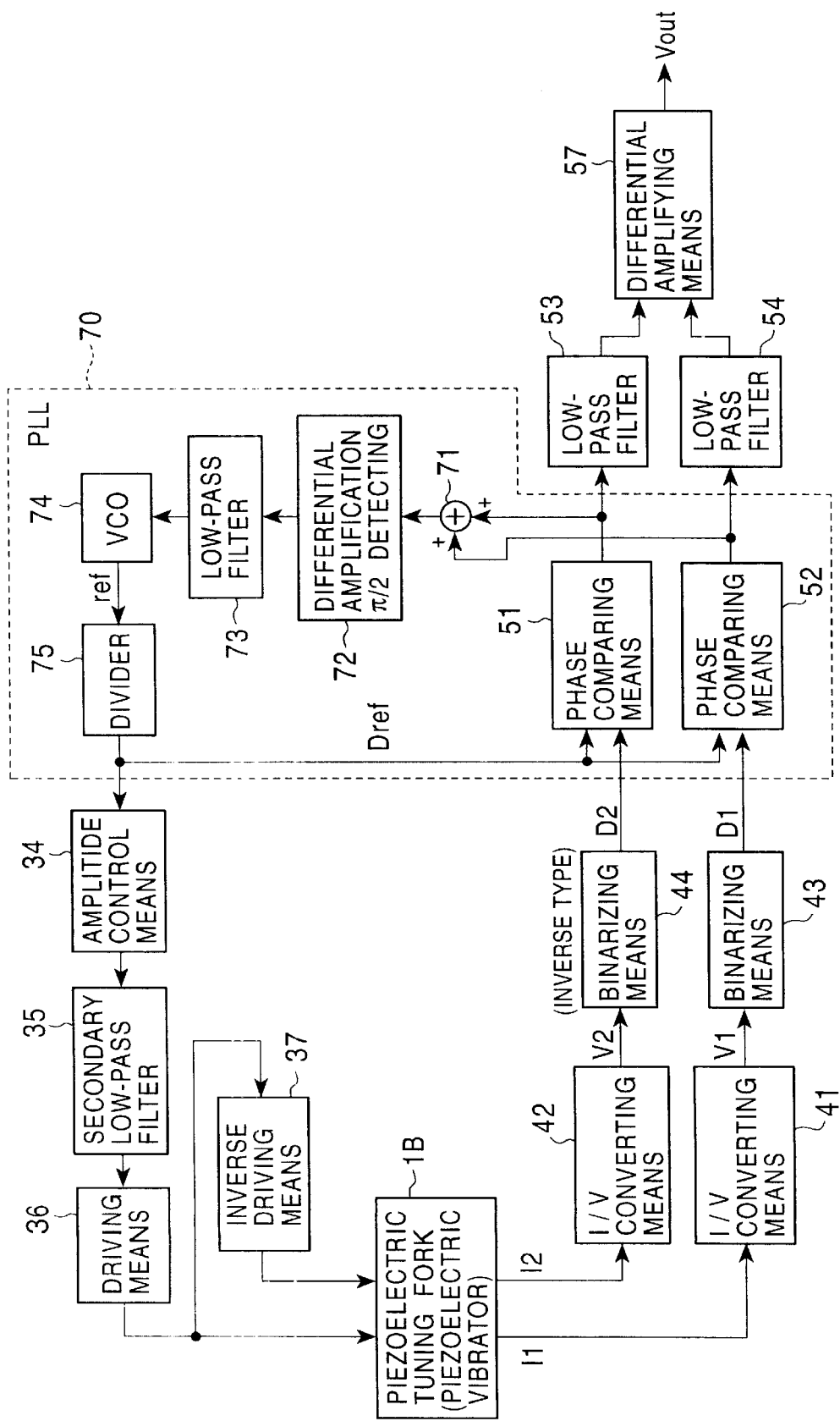
FIG. 16 is a block constructional diagram of a driving apparatus of a piezoelectric vibrator when using a PLL for the piezoelectric vibrator of a differential polarizing type.
Figure 17:
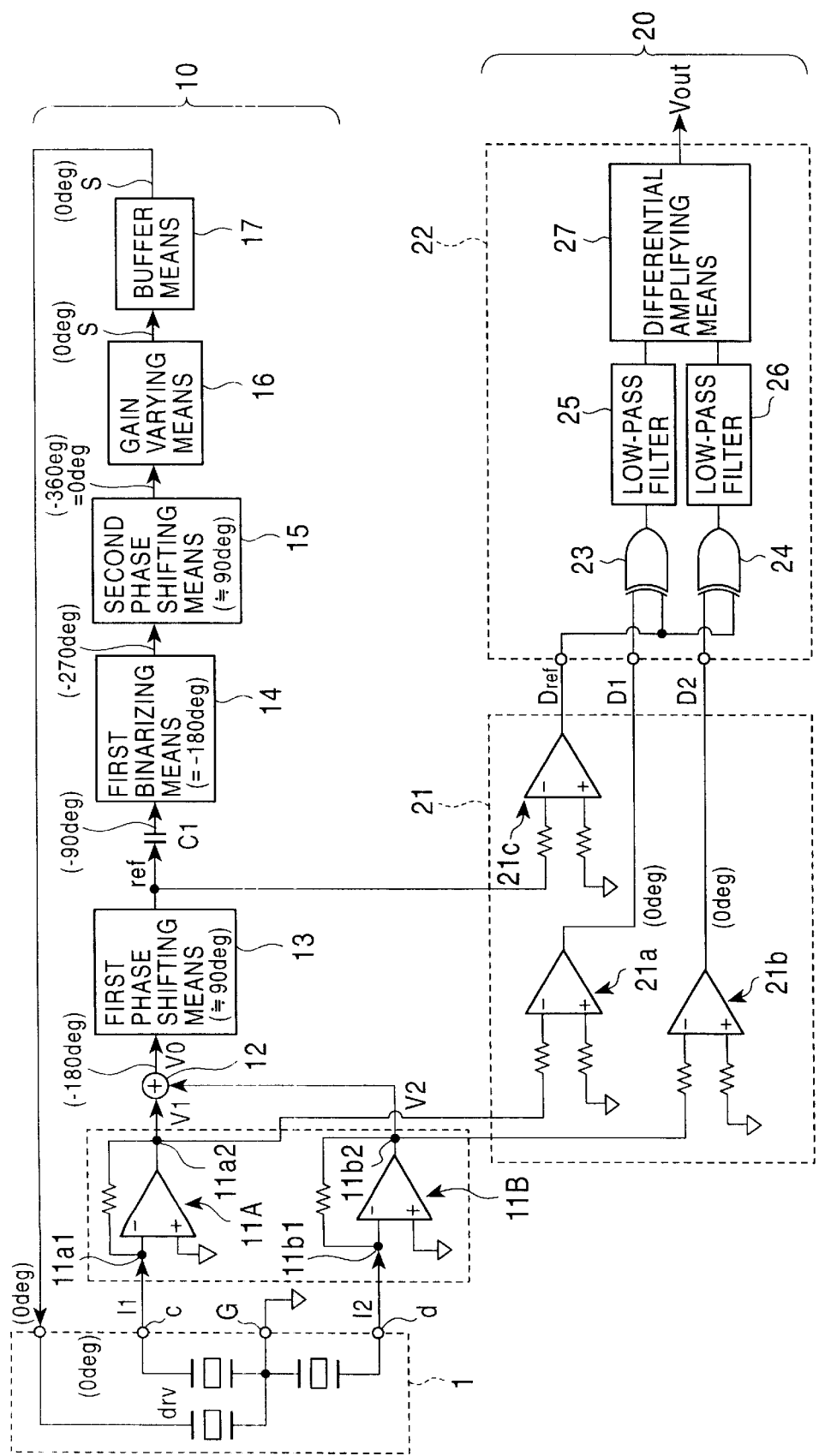
FIG. 17 is a circuit constructional diagram showing driving means and detecting means of a piezoelectric vibrator for a conventional gyroscope.

FIG. 16 is a block constructional diagram of the driving apparatus of the piezoelectric vibrator when using the PLL for the piezoelectric vibrator of the differential polarizing type.

If the piezoelectric vibrator 1B of the same polarizing type is employed in replacement with the piezoelectric vibrator 1 of the differential polarizing type in the block construction of FIG. 12, it is possible to obtain the block constructional diagram shown in FIG. 16. Namely, similarly to the block constructional diagram of FIG. 1, the driving means 36 of the forward type and the driving means 37 of the inverse type are utilized and the piezoelectric vibrator 1B therefore can be vibrated. The binarizing means 43 may be the inverse type.

As expressed above, according to any one of the embodiments, it is able to generate the reference signal $D_{ref}$ whose phase is deviated exactly by 90 deg from the median $\lambda/2$ of the phase differential $\lambda$ between the digital outputs D1 and D2 which are obtained by converting the current outputs I1 and I2, so that the phase in the driving apparatus of the piezoelectric vibrator can be stabilized.

Accordingly, the phase differential detecting means can obtain an angular velocity output with high precision.

According to the present invention which has been described in detail, the drive signal can be synchronized exactly with reference to the median of the phase differential between the two current outputs from the piezoelectric vibrator. Therefore, the driving system of the piezoelectric vibrator can be vibrated by a stable phase.

The phase differential detecting means can detect an angular velocity with higher precision because it is possible to set the phase differential between the reference signal and the median of the two current output phases to 90 deg.

What is claimed is:

1. A driving apparatus of a piezoelectric vibrator, comprising:

a piezoelectric vibrator having a pair of drive electrodes on one surface of a vibrating leg and a pair of output electrodes on another surface of the vibrating leg; first and second I/V converting mechanisms to convert first and second current outputs, which are detected from said pair of drive electrodes, into first and second voltage outputs; first and second binarizing mechanisms to convert said voltage outputs into first and second digital outputs with reference to a predetermined threshold level; a phase shifting mechanism to generate a reference signal from said first and second digital outputs; an amplitude control mechanism to add a predetermined bias voltage to said reference signal; a low-pass filter to shift a phase of an output of said amplitude control mechanism and convert a rectangular wave into a sine wave; and a driving mechanism to generate a drive signal to amplitude-driving the piezoelectric vibrator from an output from the low-pass filter, wherein said drive signal is generated with reference to a median of a phase differential between said first and second current outputs.

2. A driving apparatus of a piezoelectric vibrator according to claim 1, wherein said phase shifting mechanism comprises: an adder; an integrator; and a binarizing circuit.

3. A driving apparatus of a piezoelectric vibrator according to claim 1, wherein said phase shifting mechanism comprises: an adder; a differential amplifier; a low-pass filter; a VCO; a divider; and a phase comparator constructing a part of phase differential detecting mechanism.

4. A driving apparatus of a piezoelectric vibrator according to 1, wherein said reference signal is phase-deviated by a predetermined amount from the median of the phase differential between the first and second digital outputs.

5. A driving apparatus of a piezoelectric vibrator according to claim 4, wherein said reference signal is phase-deviated by 90 deg from the median of the phase differential between the first and second digital outputs.

* * * * *

UNITED STATES PATENT AND TRADEMARK OFFICE
CERTIFICATE OF CORRECTION

PATENT NO. : 6,255,760 B1
DATED : July 3, 2001
INVENTOR(S) : Kazuo Hasegawa et al.

It is certified that error appears in the above-identified patent and that said Letters Patent is hereby corrected as shown below:

<u>Column 16,</u>
Line 44, insert -- claim -- before "1,".

Signed and Sealed this

Twenty-eighth Day of May, 2002

*Attest:*

*Attesting Officer*

JAMES E. ROGAN
*Director of the United States Patent and Trademark Office*